(12) United States Patent
Tezuka et al.

(10) Patent No.: US 8,074,139 B2
(45) Date of Patent: Dec. 6, 2011

(54) COMMUNICATION METHOD AND COMMUNICATION DEVICE

(75) Inventors: Tadanori Tezuka, Fukuoka (JP); Tsutomu Sekibe, Kanagawa (JP); Shunichi Kuromaru, Fukuoka (JP); Junji Michiyama, Kanagawa (JP); Hiroshi Nakamura, Tokyo (JP); Masaaki Kondo, Tokyo (JP); Takashi Nanya, Kanagawa (JP); Masashi Imai, Tokyo (JP); Nassu Tomoyuki Bogdan, Tokyo (JP)

(73) Assignees: Panasonic Corporation, Osaka (JP); The University of Tokyo, Tokyo (JP)

( * ) Notice: Subject to any disclaimer, the term of this patent is extended or adjusted under 35 U.S.C. 154(b) by 1070 days.

(21) Appl. No.: 11/819,290

(22) Filed: Jun. 26, 2007

(65) Prior Publication Data
US 2008/0126906 A1 May 29, 2008

(30) Foreign Application Priority Data

Jun. 27, 2006 (JP) ................................. 2006-176889

(51) Int. Cl.
*H04L 1/18* (2006.01)
(52) U.S. Cl. ......................... 714/748; 714/754; 714/758
(58) Field of Classification Search .................. 714/748, 714/749, 750, 754, 758
See application file for complete search history.

(56) References Cited

U.S. PATENT DOCUMENTS

| 4,970,714 A * | 11/1990 | Chen et al. ..................... 370/216 |
| 6,182,264 B1 * | 1/2001 | Ott ................................. 714/774 |
| 2005/0235190 A1 * | 10/2005 | Miyazaki et al. ............. 714/748 |

FOREIGN PATENT DOCUMENTS

JP 5-169962 7/1993

OTHER PUBLICATIONS

Myers, et al., "RFC 1939—Post Office Protocol (POP) Version 3", [online] May 1996, IAB (Internet Architecture Board) standard recommendation RFC (Request for Comments), [searched on Apr. 3, 2006]<URL: http://www.ietf.org/rfc/rfc1939.txt>.

* cited by examiner

*Primary Examiner* — Fritz Alphonse
(74) *Attorney, Agent, or Firm* — Wenderoth Lind & Ponack, L.L.P.

(57) ABSTRACT

A request change unit outputs a command as a request under control of a judgment control unit. A response condition determination unit determines a condition that is to be matched by a correct response which is to be returned from the other device-in-communication in reply to the command if the other device-in-communication operates in conformity with a protocol. A check unit checks a response received from the other device-in-communication in reply to the command, against the condition. If the received response does not match the condition but is correctable to match the condition as a result of the check, a response correction unit corrects the received response to match the condition under control of the judgment control unit.

9 Claims, 23 Drawing Sheets

FIG. 3

| OSI REFERENCE MODEL | TCP/IP LAYER MODEL | |
|---|---|---|
| APPLICATION LAYER | APPLICATION LAYER | E-MAIL SOFTWARE, etc. |
| PRESENTATION LAYER | | POP3 |
| SESSION LAYER | | ADAPTIVE COMMUNICATION PROCESSING |
| TRANSPORT LAYER | TRANSPORT LAYER | TCP, UDP |
| NETWORK LAYER | INTERNET LAYER | IP |
| DATA LINK LAYER | NETWORK INTERFACE LAYER | IEEE802.3 IEEE802.11a/g/b ... |
| PHYSICAL LAYER | | |

FIG. 5

| COMMAND NAME | | RESPONSE CONDITION |
|---|---|---|
| USER | USER NAME | [+OK\|-ERR] CHARACTER STRING (MESSAGE) |
| PASS | PASSWORD | [+OK\|-ERR] CHARACTER STRING |
| STAT | | [+OK\|-ERR] NUMBER OF SAVED MESSAGES  TOTAL MAIL SIZE |
| LIST | MESSAGE NUMBER | FIRST LINE: [+OK\|-ERR] NUMBER OF SAVED MESSAGES  TOTAL MAIL SIZE<br>FOR EACH MESSAGE: MESSAGE NUMBER  INDIVIDUAL MAIL SIZE |
| RETR | MESSAGE NUMBER | FIRST LINE: [+OK\|-ERR] STATUS<br>FROM SECOND LINE: MESSAGE BODY CORRESPONDING TO MESSAGE NUMBER |
| TOP | MESSAGE NUMBER  NUMBER OF LINES | FIRST LINE: [+OK\|-ERR] STATUS<br>FROM SECOND LINE: HEADER + MESSAGE BODY OF DESIGNATED NUMBER OF LINES |
| DELE | MESSAGE NUMBER | [+OK\|-ERR] STATUS |
| RSET | | [+OK\|-ERR] STATUS |
| UIDL | MESSAGE NUMBER | FIRST LINE: [+OK\|-ERR] STATUS<br>FROM SECOND LINE: MESSAGE NUMBER AND UIDL |
| QUIT | | [+OK\|-ERR] STATUS |

FIG. 6

| COMMAND | ALTERNATIVE COMMAND (GROUP) (1) | ALTERNATIVE COMMAND (GROUP) (2) | ALTERNATIVE COMMAND (GROUP) (3) |
|---|---|---|---|
| TOP | RETR | — | — |
| LIST | STAT | — | — |
|  |  |  |  |

FIG. 7

| REQUEST DESTINATION | COMMAND |
|---|---|
| COMMUNICATION DEVICE A | TOP |
|  |  |

FIG. 8

| REQUEST DESTINATION | COMMAND | ALTERNATIVE COMMAND (GROUP) |
|---|---|---|
| COMMUNICATION DEVICE A | TOP | RETR |
|  |  |  |

FIG. 22

| COMMAND | ALTERNATIVE (1) | | ALTERNATIVE (2) | | ALTERNATIVE (3) | |
|---|---|---|---|---|---|---|
| | ALTERNATIVE COMMAND (GROUP) | ALTERNATIVE OPERATION LEVEL | ALTERNATIVE COMMAND (GROUP) | ALTERNATIVE OPERATION LEVEL | ALTERNATIVE COMMAND (GROUP) | ALTERNATIVE OPERATION LEVEL |
| COMMAND A | ALTERNATIVE COMMAND A1 | 3 | ALTERNATIVE COMMAND A2 | 4 | ALTERNATIVE COMMAND A3 | 4 |
| COMMAND B | ALTERNATIVE COMMAND B1 | 2 | ALTERNATIVE COMMAND B2 | 4 | ALTERNATIVE COMMAND B3 | 5 |

COMMUNICATION METHOD AND COMMUNICATION DEVICE

BACKGROUND OF THE INVENTION

1. Field of the Invention

The present invention relates to communication techniques of sending/receiving a request and a response between communication devices.

2. Related Art

Nowadays, communication devices such as personal computers and network appliances perform communication with other communication devices based on various protocols. For example, communication between communication devices is performed by using various networks such as the Internet and a LAN (Local Area Network), or various hardware interfaces.

POP3 (Post Office Protocol version 3, RFC 1939) is known as such a protocol that is used in communication between communication devices.

Communication between communication devices based on a protocol such as POP3 is conducted by one communication device sending a request and the other communication device returning a response to the request.

POP3 is described in detail in the following:

J. Myers, "RFC 1939-Post Office Protocol (POP) Version 3", [online] May 1996, IAB (Internet Architecture Board) standard recommendation RFC (Request for Comments), [searched on Apr. 3, 2006]<URL: http://www.ietf.org/rfc/rfc1939.txt>.

In communication between communication devices based on a protocol such as POP3, if a response to a request has an error, that is, if data that does not conform to a procedure or format prescribed by the protocol is returned as a response, a communication device that sends the request terminates communication processing for the occurrence of the error.

For instance, in the case where the protocol is not implemented strictly in a communication device that receives the request or part of the implemented protocol contains a bug, the communication device will end up returning a wrong response to the request. Whenever this happens, error termination occurs in the communication between the communication devices.

SUMMARY OF THE INVENTION

The present invention was conceived in view of the above problem, and aims to provide a communication method and a communication device that can suppress the occurrence of error termination in communication between communication devices as much as possible even when a wrong response is returned in reply to a request.

The stated aim can be achieved by a communication method used in a communication device that sends a request to an other communication device and receives a response to the request from the other communication device, the communication method including: a sending step of sending a command of the request to the other communication device; a determination step of determining a condition that is to be matched by a correct response, the correct response being to be sent from the other communication device in reply to the command if the other communication device operates in conformity with a predetermined protocol; a check step of checking a response received from the other communication device in reply to the command, against the condition determined in the determination step; and a correction step of, if the received response fails to match the condition in the check step, correcting the received response to match the condition.

The stated aim can also be achieved by a communication device that sends a request to an other communication device and receives a response to the request from the other communication device, the communication device including: a sending unit operable to send a command of the request to the other communication device; a determination unit operable to determine a condition that is to be matched by a correct response, the correct response being to be sent from the other communication device in reply to the command if the other communication device operates in conformity with a predetermined protocol; a check unit operable to check a response received from the other communication device in reply to the command, against the condition determined by the determination unit; and a correction unit operable to, if the received response fails to match the condition as a result of the check by the check unit, correct the received response to match the condition.

According to the above method and construction, the response returned in reply to the command of the request is checked against the condition that is to be matched by the correct response which is to be returned from the other communication device if the other communication device operates in conformity with the protocol. If the response does not match the condition, the response is corrected to match the condition. Thus, by correcting the response returned in reply to the command of the request if the response has an error, the occurrence of error termination in the communication, which is caused by the existence of the error in the response returned in reply to the command of the request, can be suppressed.

Here, the communication method may further include: a level reception step of receiving a restriction level for restricting the correction of the response, wherein an execution level of the correction of the response is set in advance, and the correction step is executed if the execution level exceeds the restriction level.

According to this method, for example, the user can decide whether or not to perform response correction that has a high degree of risk in terms of security.

The stated aim can also be achieved by a communication method used in a communication device that sends a request to an other communication device and receives a response to the request from the other communication device, the communication method including: a sending step of sending a command of the request to the other communication device; a determination step of determining a condition that is to be matched by a correct response, the correct response being to be sent from the other communication device in reply to the command if the other communication device operates in conformity with a predetermined protocol; a check step of checking a response received from the other communication device in reply to the command, against the condition determined in the determination step; a replacement step of, if the received response fails to match the condition in the check step, specifying one or more alternative commands that substitute for the command, and executing communication with the other communication device by using the one or more alternative commands sequentially; and a generation step of generating a response that matches the condition, based on a response received from the other communication device in reply to each of the one or more alternative commands.

The stated aim can also be achieved by a communication device that sends a request to an other communication device and receives a response to the request from the other communication device, the communication device including: a sending unit operable to send a command of the request to the other communication device; a determination unit operable to determine a condition that is to be matched by a correct response, the correct response being to be sent from the other communication device in reply to the command if the other communication device operates in conformity with a predetermined protocol; a check unit operable to check a response received from the other communication device in reply to the command, against the condition determined by the determination unit; a replacement unit operable to, if the received response fails to match the condition as a result of the check by the check unit, specify one or more alternative commands that substitute for the command, and execute communication with the other communication device by using the one or more alternative commands sequentially; and a generation unit operable to generate a response that matches the condition, based on a response received from the other communication device in reply to each of the one or more alternative commands.

According to the above method and construction, the response returned in reply to the command of the request is checked against the condition that is to be matched by the correct response which is to be returned from the other communication device if the other communication device operates in conformity with the protocol. If the response does not match the condition, one or more alternative commands that substitute for the command are used to communicate with the other communication device, and the response that matches the condition is generated based on the response returned in reply to each alternative command. Thus, if the response returned in reply to the command of the request has an error, the communication with the other communication device is performed using one or more alternative commands, and the response corresponding to the command is generated based on the response returned in reply to each alternative command. By doing so, the occurrence of error termination in the communication, which is caused by the existence of the error in the response returned in reply to the command of the request, can be suppressed.

Here, the communication method may further include: a judgment step of, if the received response fails to match the condition in the check step, judging whether or not the received response is correctable to match the condition, wherein the replacement step is executed if the received response is not correctable to match the condition in the judgment step, and the received response is corrected to match the condition if the received response is correctable to match the condition in the judgment step.

According to this method, if the response-returned in reply to the command of the request is correctable to match the condition, the response is corrected. Otherwise, the communication using one or more alternative commands is performed. This makes it possible to suppress the occurrence of error termination in the communication, which is caused by the existence of the error in the response returned in reply to the command of the request, while reducing an increase in communication load between the communication devices.

Here, the communication method may further include: an alternative determination step of determining, for each of the one or more alternative commands, an alternative condition that is to be matched by a correct response which is to be sent from the other communication device in reply to the alternative command if the other communication device operates in conformity with the predetermined protocol; and an alternative check step of checking the response received from the other communication device in reply to each of the one or more alternative commands, against the alternative condition determined in the alternative determination step, wherein if the response received in reply to each of the one or more alternative commands matches the alternative condition or is correctable to match the alternative condition in the alternative check step, the one or more alternative commands are used instead of the command in subsequent communication.

According to this method, if the response returned in reply to the command of the request does not match the condition, one or more alternative commands that substitute for the command will be prioritized over the command in subsequent communication. This reduces an increase in communication load between the communication devices.

Here, the communication method may further include: an alternative determination step of determining, for each of the one or more alternative commands, an alternative condition that is to be matched by a correct response which is to be sent from the other communication device in reply to the alternative command if the other communication device operates in conformity with the predetermined protocol; and an alternative check step of checking the response received from the other communication device in reply to each of the one or more alternative commands, against the alternative condition determined in the alternative determination step, wherein if a response received from the other communication device in reply to any of the one or more alternative commands fails to match an alternative condition determined for the alternative command and is not correctable to match the alternative condition in the alternative check step, the replacement step is executed again.

According to this method, the occurrence of error termination in the communication can be further suppressed by repeating the replacement step.

Here, the communication method may further include: a level reception step of receiving a restriction level for restricting the communication with the other communication device in the replacement step, wherein an execution level of the communication by using the one or more alternative commands is set in advance, and the communication with the other communication device by using the one or more alternative commands in the replacement step is executed if the execution level exceeds the restriction level.

According to this method, for example, the user can decide to what extent continued communication using one or more alternative commands that has a high degree of risk in terms of security is to be performed.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows a hierarchical structure of the communication device shown in FIG. 1;

FIG. 5 shows an example of a response condition database (response condition DB) shown in FIG. 4;

FIG. 6 shows an example of a command database (command DB) shown in FIG. 4;

FIG. 7 shows an example of a correction database (correction DB) shown in FIG. 4;

FIG. 8 shows an example of an alternative database (alternative DB) shown in FIG. 4;

FIG. 22 shows an example of a command database (command DB) shown in FIG. 21;

DETAILED DESCRIPTION OF THE INVENTION

First Embodiment

The following describes a first embodiment of the present invention with reference to drawings.
<System Construction>

Figure 1:
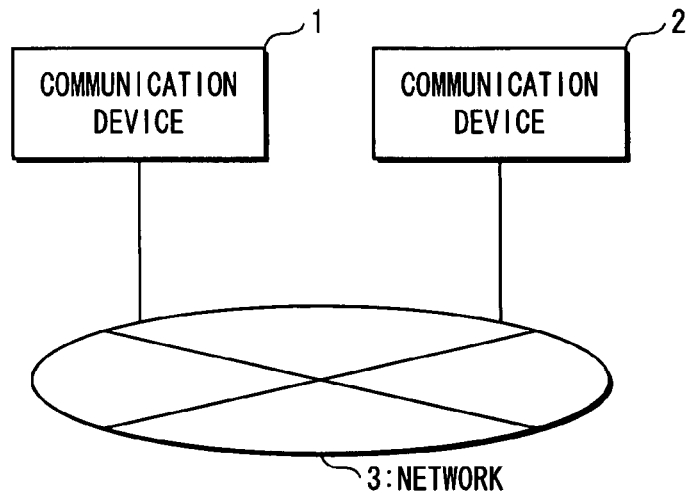
FIG. 1 shows a system construction of a communication system according to a first embodiment of the present invention.

A construction of a communication system according to the first embodiment is described below, with reference to FIG. 1. FIG. 1 shows a system construction of the communication system according to the first embodiment.

The communication system includes communication devices 1 and 2. The communication devices 1 and 2 are connected to a network 3. The network 3 may be a local area network or a wide area network such as the Internet. Also, the network 3 may be a wired network or a wireless network.

The communication device 1 has functions of executing a communication method according to the present invention, and sends/receives a request and a response to the request with the other communication device.

For example, the communication device 1 sends a command of a request to the other device-in-communication, and receives a response from the other device-in-communication in reply to the command of the request. If the received response has an error, depending on the error in the received response, the communication device 1 corrects the received response, or performs communication with the other device-in-communication by using one or more alternative commands that substitute for the command.

One or more alternative commands referred to here (i.e. one alternative command or one alternative command group that is composed of a plurality of alternative commands) enable, when the request source communication device receives an error-free response in reply to each alternative command, the communication device to generate an error-free response corresponding to the command based on the error-free response received in reply to each alternative command.

An error-free response referred to here is a correct response that is to be returned from the other device-in-communication in reply to a command or an alternative command if the other device-in-communication operates in conformity with a predetermined protocol.

The communication device 2 sends/receives a request and a response to the request with the other communication device. The communication device 2 may or may not have functions of executing the communication method according to the present invention.

The present invention relates to a construction in which, when a response to a request has an error, a communication device that sends the request performs correction of the response and the like depending on the error in the response. In view of this, the following description of functions and operations of the communication device 1 only concerns the case where the communication device 1 sends a request.
<Device Construction of the Communication Device>

Figure 2:
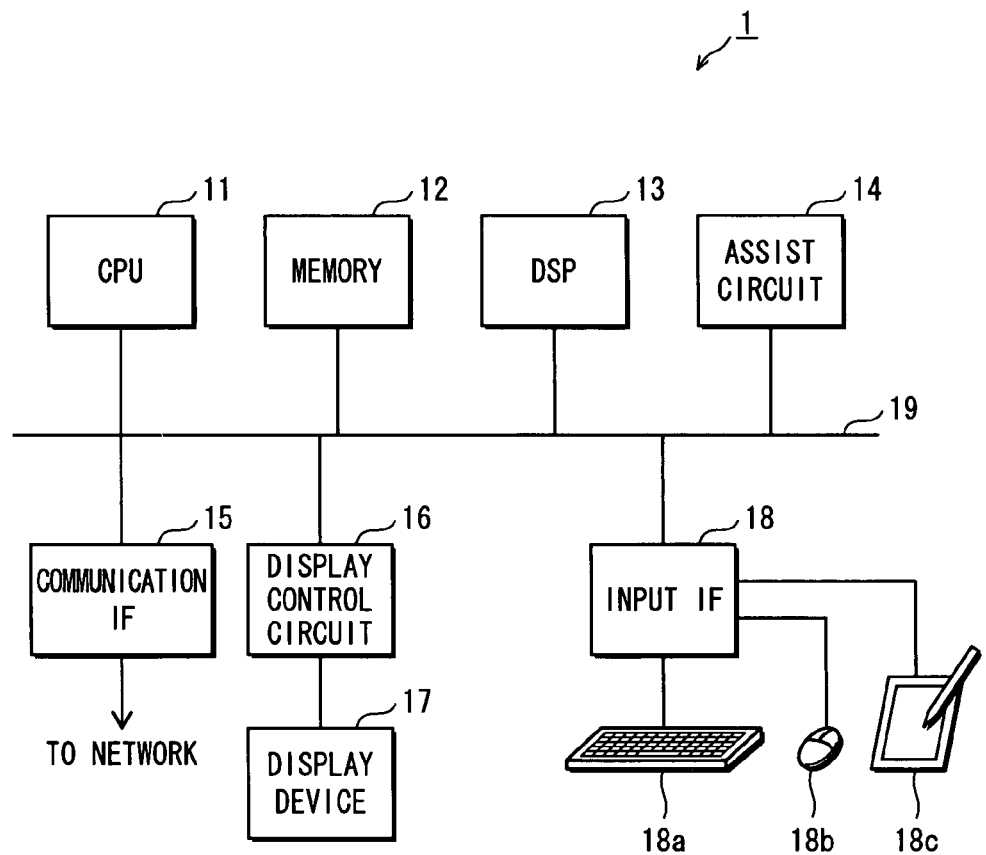
FIG. 2 shows a device construction of a communication device shown in FIG. 1.

A device construction of the communication device 1 shown in FIG. 1 is described below, with reference to FIG. 2. FIG. 2 shows the device construction of the communication device 1 shown in FIG. 1.

The communication device 1 includes a CPU (Central Processing Unit) 11, a memory 12, a DSP (Digital Signal Processor) 13, an assist circuit 14, a communication interface (communication IF) 15, a display control circuit 16, a display device 17, an input interface (input IF) 18, a keyboard 18a, a mouse 18b, and a tablet 18c. The CPU 11; the memory 12, the DSP 13, the assist circuit 14, the communication IF 15, the display control circuit 16, and the input IF 18 are each connected to a bus 19.

The CPU 11 performs various operations and controls for the whole communication device 1.

The memory 12 is a storage element. For example, various control programs for controlling the communication device 1 and various application software are stored on the memory 12.

The DSP 13 is a microprocessor specialized for processing of audio, images, and the like.

The assist circuit 14 is constructed by hardware, and assists in the processing of the CPU 11 and the like.

The communication IF 15 is used for the communication device 1 to perform communication with an external device.

In this embodiment, the communication IF 15 is capable of sending/receiving TCP/IP (Transmission Control Protocol/Internet Protocol) packets. As an example, the communication IF 15 is based on a standard such as Ethernet (registered trademark) a wireless network, USB (Universal Serial Bus), UWB (Ultra Wide Band), Bluetooth (registered trademark), or the like.

The display control circuit 16 controls the display by the display device 17.

The display device 17 is a display unit such as a CRT (Cathode Ray Tube), a liquid crystal display, and a plasma display, or a light-emitting element such as a LED (Light Emitting Diode).

The input IF 18 is used for connecting input devices such as the keyboard 18a, the mouse 18b, and the tablet 18c to the CPU 11 in the communication device 1 via the bus 19. The input devices may also include a keypad, a touch panel, and the like.

<Hierarchical Structure>

The following describes a hierarchical structure for executing processing of the communication method according to the present invention (hereafter referred to as "adaptive communication processing") in this embodiment, with reference to FIG. 3. FIG. 3 shows a hierarchical structure of the communication device 1 shown in FIG. 1.

In detail, FIG. 3 shows an OSI reference model developed by ISO (International Organization for Standardization), that divides communication functions of a communication device for realizing inter-device data communication into layers. FIG. 3 also shows a TCP/IP layer model that divides communication functions of a communication device for realizing inter-device data communication into layers.

The OSI reference model has seven layers that are an application layer, a presentation layer, a session layer, a transport layer, a network layer, a data link layer, and a physical layer.

The TCP/IP layer model has an application layer, a transport layer, an internet layer, and a network interface layer.

The adaptive communication processing in this embodiment is located between POP3 and TCP (Transmission Control Protocol) or UDP (User Datagram Protocol), and relays communication between POP3 and TCP or UDP. Here, POP3 is a processing target protocol.

Other than POP3, the processing target protocol may also be IMAP4 (Internet Message Access version 4), HTTP (Hyper Text Transfer Protocol), FTP (File Transfer Protocol), SMTP (Simple Mail Transfer Protocol), UPnP (Universal Plug and Play), SIP (Session Initiation Protocol), RTP (Real-Time Transfer Protocol), RTCP (RTP Control Protocol), and the like.

<Functional Construction of the Communication Device>

Figure 4:
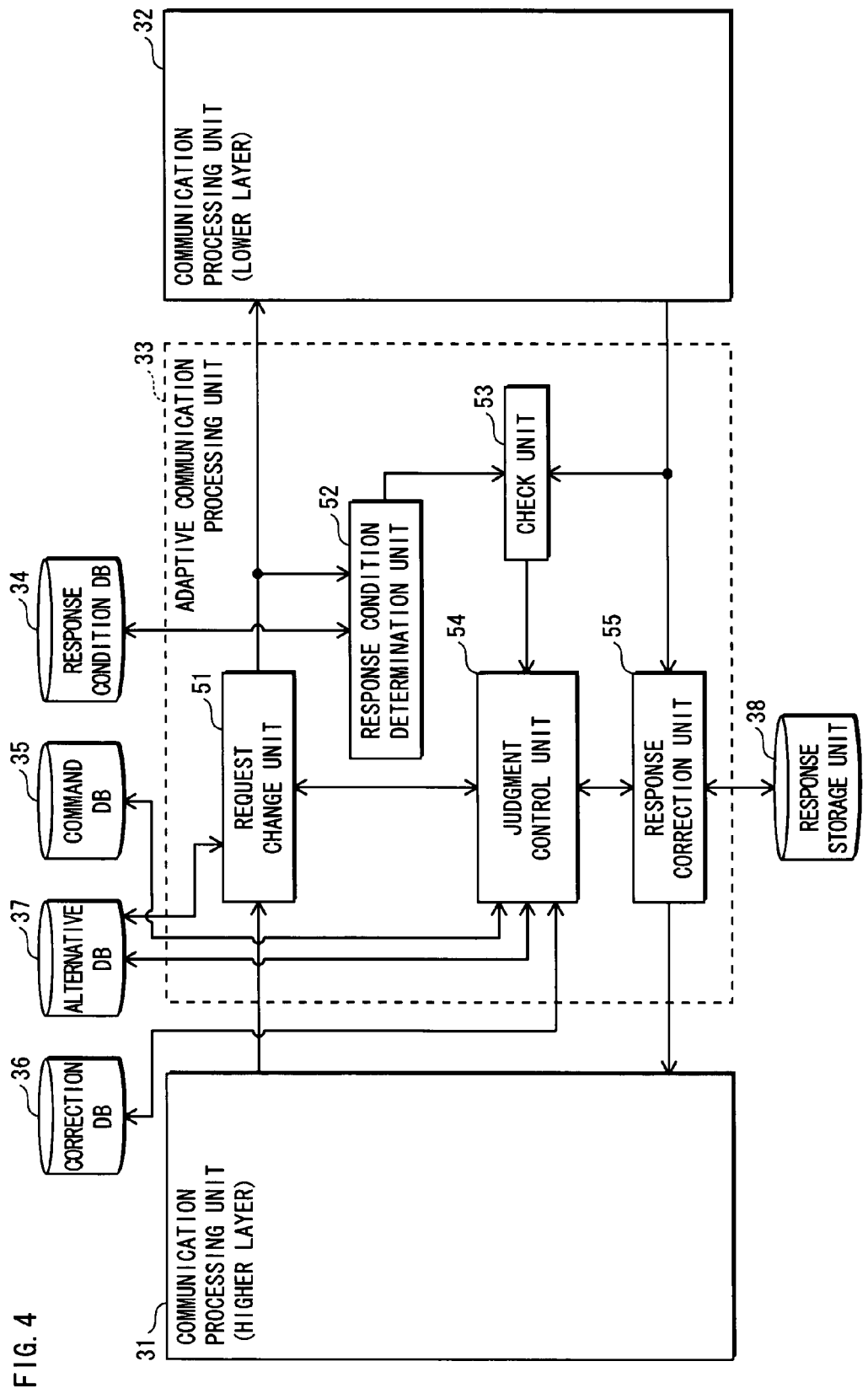
FIG. 4 shows a functional construction of the communication device shown in FIG. 1.

A functional construction of the communication device 1 shown in FIG. 1 is described below, with reference to FIG. 4. FIG. 4 shows the functional construction of the communication device 1 shown in FIG. 1.

The communication device 1 includes communication processing units 31 and 32, an adaptive communication processing unit 33, a response condition database (response condition DB) 34, a command database (command DB) 35, a correction database (correction DB) 36, an alternative database (alternative DB) 37, and a response storage unit 38.

The communication processing unit 31 is located at a higher layer of the adaptive communication processing unit 33. The communication processing unit 31 performs processing in conformity with a standard of a protocol such as POP3, and sends/receives commands and data with the adaptive communication processing unit 33. When inputting a command of a request into the adaptive communication processing unit 33, the communication processing unit 31 also inputs a device name of a request destination communication device into the adaptive communication processing unit 33 together with the command.

The communication processing unit 32 is located at a lower layer of the adaptive communication processing unit 33. The communication processing unit 32 performs processing in conformity with a standard such as TCP or UDP, and sends/receives commands and data with the adaptive communication processing unit 33.

The adaptive communication processing unit 33 is located between the communication processing units 31 and 32, and relays communication between the communication processing units 31 and 32. Functions of the adaptive communication processing unit 33 will be described in detail later.

The response condition DB 34 stores a response condition corresponding to each command of a protocol such as POP3 and IMAP4. FIG. 5 shows an example response condition corresponding to each command of POP3.

A response condition is a condition that is to be matched by a correct response which is to be returned from the request destination communication device in reply to a corresponding command if the request destination communication device operates in conformity with the protocol. If the response matches the response condition, error termination will not occur in the communication based on the protocol of the higher layer such as POP3.

If a response returned in reply to a command of a request matches a response condition stored in the response condition DB 34 in correspondence with the command, the response is error-free. If the response returned in reply to the command of the request does not match the response condition stored in the response condition DB 34 in correspondence with the command, the response has an error.

The command DB 35 stores, in correspondence with each command, an alternative command or an alternative command group made up of a plurality of alternative commands, as a substitute for the command. FIG. 6 shows an example of this In FIG. 6, an alternative command or an alternative command group that substitutes for a command stored in the field "command" is stored in the fields "alternative command (group) (1)", "alternative command (group) (2)", and "alternative command (group) (3)". Note here that one command may have a plurality of alternative commands or a plurality of alternative command groups.

The correction DB 36 stores a command or an alternative command of a request for which a response was corrected in past communication, in correspondence with a request destination communication device. FIG. 7 shows an example of this. In FIG. 7, a command or an alternative command which was sent to a communication device having a device name stored in the field "request destination" and for which a response was corrected is stored in the field "command".

By referring to the storage contents of the correction DB 36, it is possible to recognize commands which other communication devices are unable to process properly.

The alternative DB 37 stores an alternative command or an alternative command group that was used instead of a command in past communication, in correspondence with the command and a request destination communication device. FIG. 8 shows an example of this. The contents of the alternative DB 37 are changed as appropriate while communication is being performed with another communication device. In FIG. 8, an alternative command or an alternative command group that was used in past communication for a communication device having a device name stored in the field "request destination" instead of a command stored in the field "command" is stored in the field "alternative command (group)".

By referring to the storage contents of the alternative DB 37, it is possible to recognize commands which other communication devices are unable to process properly.

The response storage unit 38 stores a response or a corrected response to each alternative command.

<Functional Construction of the Adaptive Communication Processing Unit>

The adaptive communication processing unit 33 functions as a request change unit 51, a response condition determination unit 52, a check unit 53, a judgment control unit 54, and a response correction unit 55.

The request change unit 51 is controlled by the judgment control unit 54, and outputs a command of a request received from the communication processing unit 31 to the communication processing unit 32 and the response condition determination unit 52, or outputs an alternative command or each alternative command in an alternative command group stored in the alternative DB 37 to the communication processing unit 32 and the response condition determination unit 52.

The response condition determination unit 52 extracts, from the response condition DB 34, a response condition corresponding to a command or an alternative command received from the request change unit 51, to determine the response condition. The response condition determination unit 52 outputs the determined response condition to the check unit 53.

The check unit 53 checks a response received from the communication processing unit 32 against the response condition received from the response condition determination unit 52, and outputs a result of the check to the judgment control unit 54.

The judgment control unit 54 controls the request change unit 51 based on the storage contents of the correction DB 36 and the alternative DB 37, and controls the response correction unit 55 based on the storage contents of the correction DB 36 and the alternative DB 37 and the check result received from the check unit 53.

The judgment control unit 54 searches the command DB 35 for an alternative command or an alternative command group, in accordance with the check result received from the check unit 53. The judgment control unit 54 stores the alternative command or alternative command group found as a result of the search, in the alternative DB 37 in correspondence with a request destination communication device and the command input from the communication processing unit 31 into the adaptive communication processing unit 33.

The response correction unit 55 is controlled by the judgment control unit 54, and outputs the response received from the communication processing unit 32 directly to the communication processing unit 31, or corrects the received response to match the response condition and outputs the corrected response to the communication processing unit 31.

Also, the response correction unit 55 stores the response received from the communication processing unit 32 directly to the response storage unit 38, or corrects the received response to match the response condition and stores the corrected response to the response storage unit 38, under control of the judgment control unit 54. The response correction unit 55 generates a response that matches the response condition corresponding to the command input from the communication processing unit 31 into the adaptive communication processing unit 33, based on the response stored in the response storage unit 38, and outputs the generated response to the communication processing unit 31.

<Operation of the Adaptive Communication Processing Unit: Main Flow>

Figure 9:
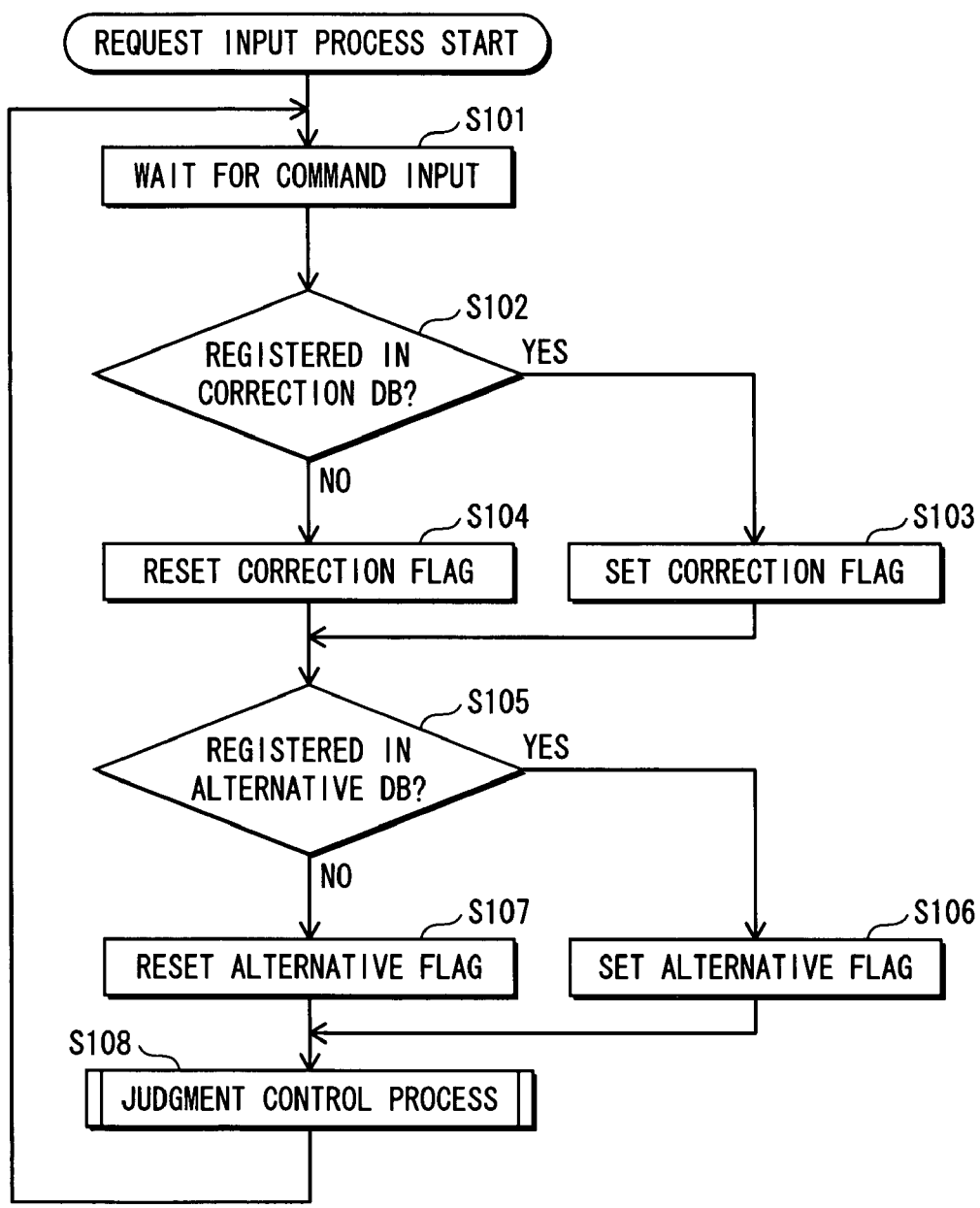
FIG. 9 is a flowchart of a main flow of a processing operation performed by an adaptive communication processing unit shown in FIG. 4.

An operation of the adaptive communication processing unit 33 shown in FIG. 4 is described below, with reference to FIG. 9. FIG. 9 is a flowchart of a main flow of a processing operation performed by the adaptive communication processing unit 33 shown in FIG. 4.

The request change unit 51 waits for input of a command of a request from the communication processing unit 31. Upon receiving the command of the request, the request change unit 51 outputs the received command to the judgment control unit 54 (step S101).

The judgment control unit 54 judges whether or not the command is registered in the correction DB 36 in correspondence with the request destination communication device (step S102). If the command is registered in the correction DB 36 (step S102: YES) the judgment control unit 54 sets a correction flag (step S103), and proceeds to step S105. If the command is not registered in the correction DB 36 (step S102: NO), the judgment control unit 54 resets the correction flag (step S104), and proceeds to step S105.

The judgment control unit 54 judges whether or not the command is registered in the field "command" in the alternative DB 37 in correspondence with the request destination communication device (step S105). If the command is registered in the alternative DB 37 (step S105: YES), the judgment control unit 54 sets an alternative flag (step S106), and proceeds to step S108. If the command is not registered in the alternative DB 37 (step S105: NO), the judgment control unit 54 resets the alternative flag (step S107), and proceeds to step S108.

The judgment control unit 54 calls a judgment control process (FIG. 10) (step S108), and then returns to step S101 to wait for input of a command.

<Operation of the Adaptive Communication Processing Unit: Judgment Control Process>

Figure 10:
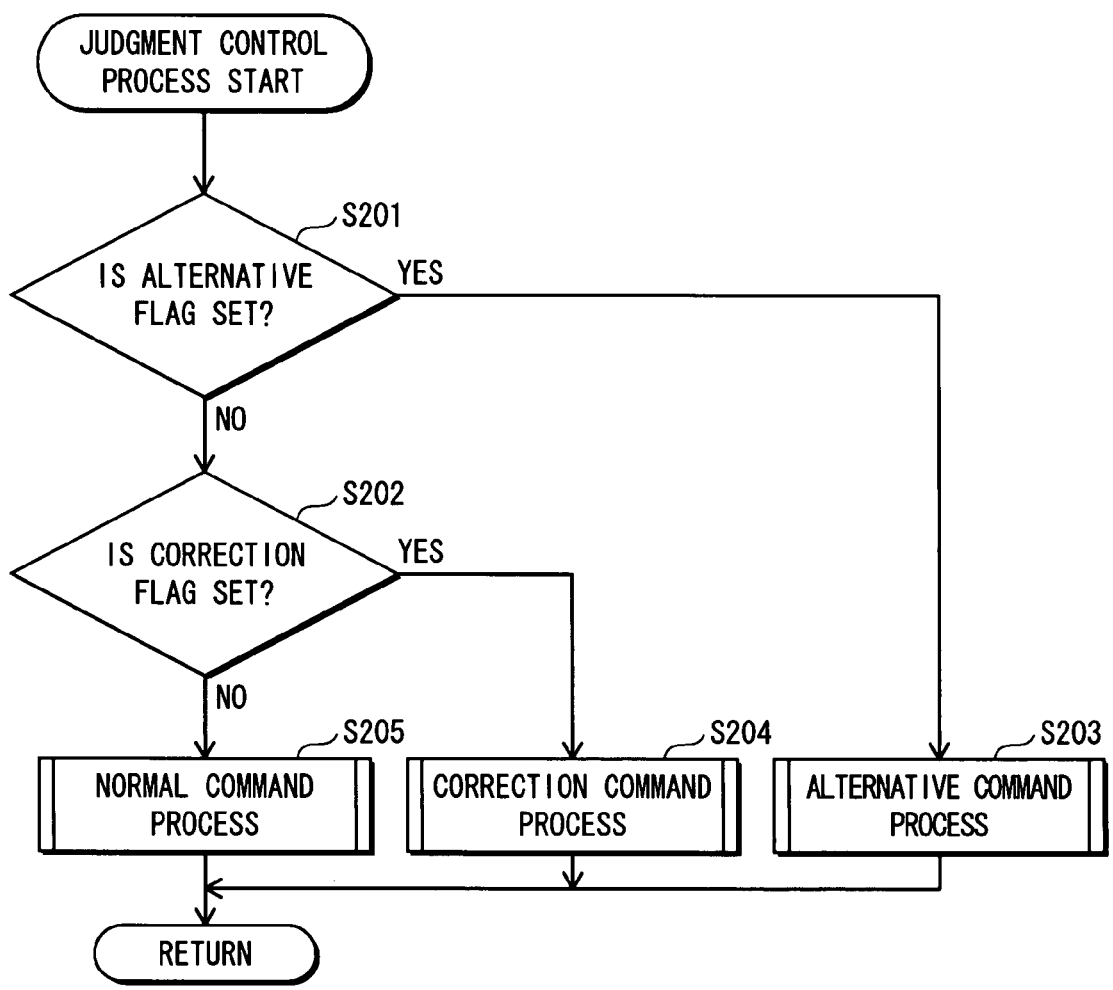
FIG. 10 is a flowchart of a judgment control process performed by the adaptive communication processing unit shown in FIG. 4.

The judgment control process (step S108) shown in FIG. 9 and a judgment control process (step S606) shown in FIG. 14 (de-scribed later), which are performed by the adaptive communication processing unit 33 shown in FIG. 4, are described below with reference to FIG. 10. FIG. 10 is a flowchart of the judgment control process (step S108) shown in FIG. 9 and the judgment control process (step S606) shown in FIG. 14.

The judgment control unit 54 judges whether or not the alternative flag is set (step S201).

If the alternative flag is set (step S201: YES), the judgment control unit 54 calls an alternative command process (FIG. 11) (step S203), and then returns to the caller.

If the alternative flag is not set (step S201: NO), the judgment control unit 54 judges whether or not the correction flag is set (step S202).

If the correction flag is set (step S202: YES), the judgment control unit 54 calls a correction command process (FIG. 12) (step S204), and then returns to the caller.

If the correction flag is not set (step S202: NO), the judgment control unit 54 calls a normal command process (FIG. 13) (step S205), and then returns to the caller.

<Operation of the Adaptive Communication Processing Unit: Alternative Command Process>

Figure 11:
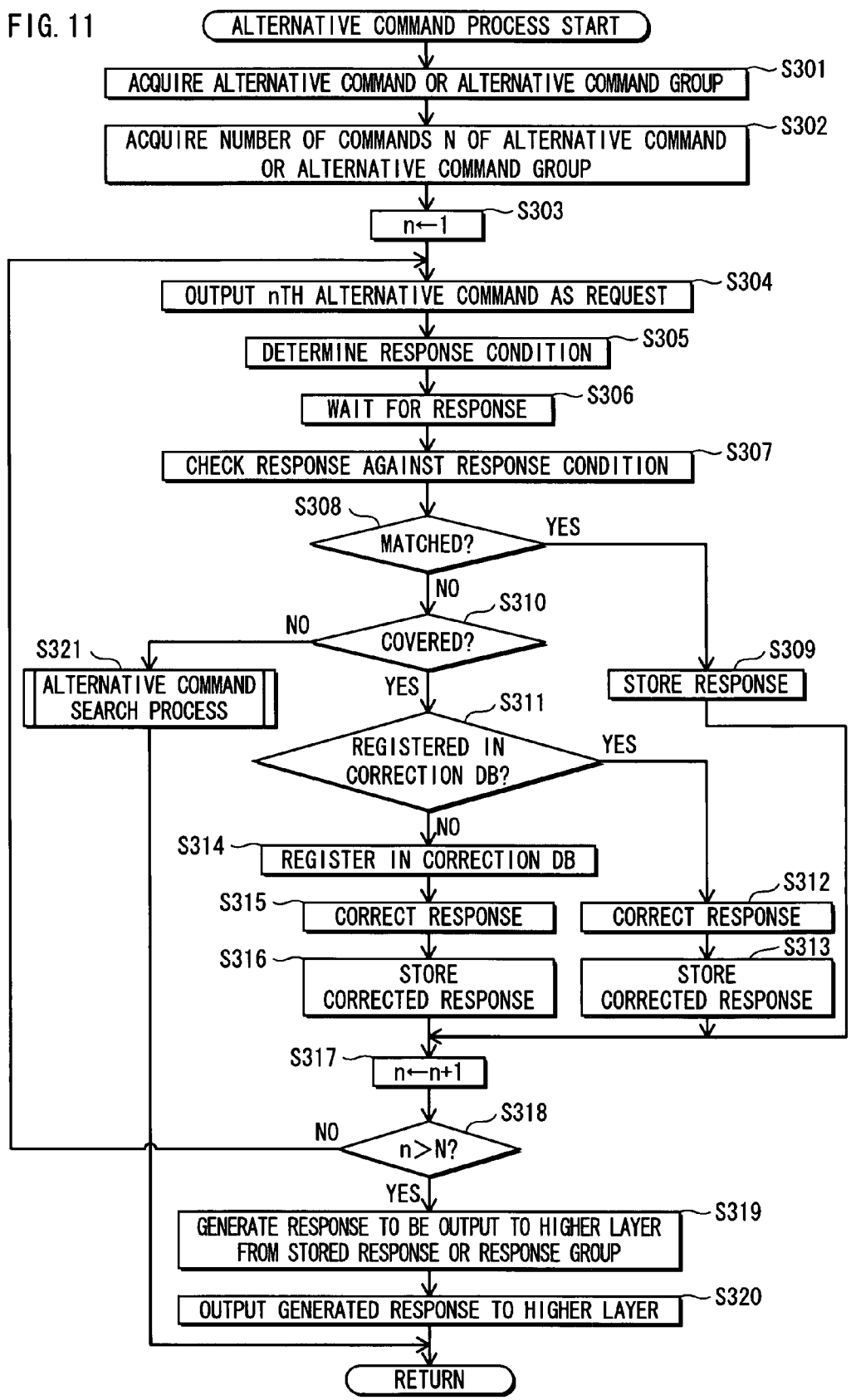
FIG. 11 is a flowchart of an alternative command process performed by the adaptive communication processing unit shown in FIG. 4.

The alternative command process (step S203) shown in FIG. 10, which is performed by the adaptive communication processing unit 33 shown in FIG. 4, is described below with reference to FIG. 11. FIG. 11 is a flow chart of the alternative command process (step S203) shown in FIG. 10.

The request change unit 51 acquires, from the alternative DB 37, an alternative command or an alternative command group registered in correspondence with the request destination communication device and the command received from the communication processing unit 31 (step S301). The request change unit 51 acquires number N that is the number of commands of the acquired alternative command or alternative command group (step S302).

The request change unit 51 sets variable n to 1 (step S303).

The request change unit 51 outputs an nth alternative command to the communication processing unit 32 and the response condition determination unit 52 as a request (step S304).

The response condition determination unit 52 extracts a response condition stored in the response condition DB 34 in correspondence with the alternative command received from the request change unit 51, to determine the response condition corresponding to the alternative command (step S305).

The adaptive communication processing-unit 33 waits for input of a response from the communication processing unit 32 (i.e. a response from the other device-in-communication) (step S306).

When the response is input from the communication processing unit 32 into the adaptive communication processing unit 33, the check unit 53 checks the received response against the response condition (step S307).

The judgment control unit 54 judges whether or not the received-response matches the response condition, based on a result of the check by the check unit 53 (step S308).

If the response matches the response condition (step S308: YES), the response correction unit 55 stores this response which is received in reply to the nth alternative command, directly to the response storage unit 38 (step S309), and proceeds to step S317.

If the response does not match the response condition (step S308: NO), the judgment control unit 54 judges, based on the check result of the check unit 53, whether or not the response covers the response condition, that is, whether or not the response is correctable to match the response condition (step S310).

The state where the response covers the response condition (i.e. the response is correctable to match the response condition) is such a state where the response received in reply to the command does not match the response condition but a response which matches the response condition can be generated from the received response.

If the response does not cover the response condition (step S310: NO), the judgment control unit 54 calls an alternative command search process (FIG. 14) (step S321), and then returns to the caller.

The state where the response does not cover the response condition is such a state where the response received in reply to the command does not match the response condition and also a response which matches the response condition cannot be generated from the received response.

If the response covers the response condition (step S310: YES), the judgment control unit 54 judges whether or not the nth alternative command is registered in the field "command" in the correction DB 36 in correspondence with the request destination communication device (step S311).

If the nth alternative command is registered in the correction DB 36 (step S311: YES), the response correction unit 55 corrects the response to match the response condition (step S312). The response correction unit 55 stores the corrected response to the response storage unit 38 as a response corresponding to the nth alternative command (step S313), and proceeds to step S317.

If the nth alternative command is not registered in the correction DB 36 (step S311: NO), the judgment control unit 54 stores a device name of the request destination communication device into the field "request destination" and the nth alternative command into the field "command" in the correction DB 36 (step S314). The response correction unit 55 corrects the response to match the response condition (step S315), stores the corrected response to the response storage unit 38 as a response corresponding to the nth alternative command (step S316), and proceeds to step S317.

The request change unit 51 increments variable n by 1 (step S317), and judges whether or not variable n is larger than number N (step S318). If variable n is not larger than number N (step S318: NO), the request change unit 51 returns to step S304.

If variable n is larger than number N (step S318: YES), the response correction unit 55 generates a response that matches the response condition corresponding to the command input from the communication processing unit 31 into the adaptive communication processing unit 32, based on a response to the alternative command or a response group made up of responses to the alternative commands that compose the alternative command group in the response storage unit 38 (step S319). The response correction unit 55 outputs the generated response to the communication processing unit 31 (step S320), and returns to the caller.

<Operation of the Adaptive Communication Processing Unit: Correction Command Process>

Figure 12:
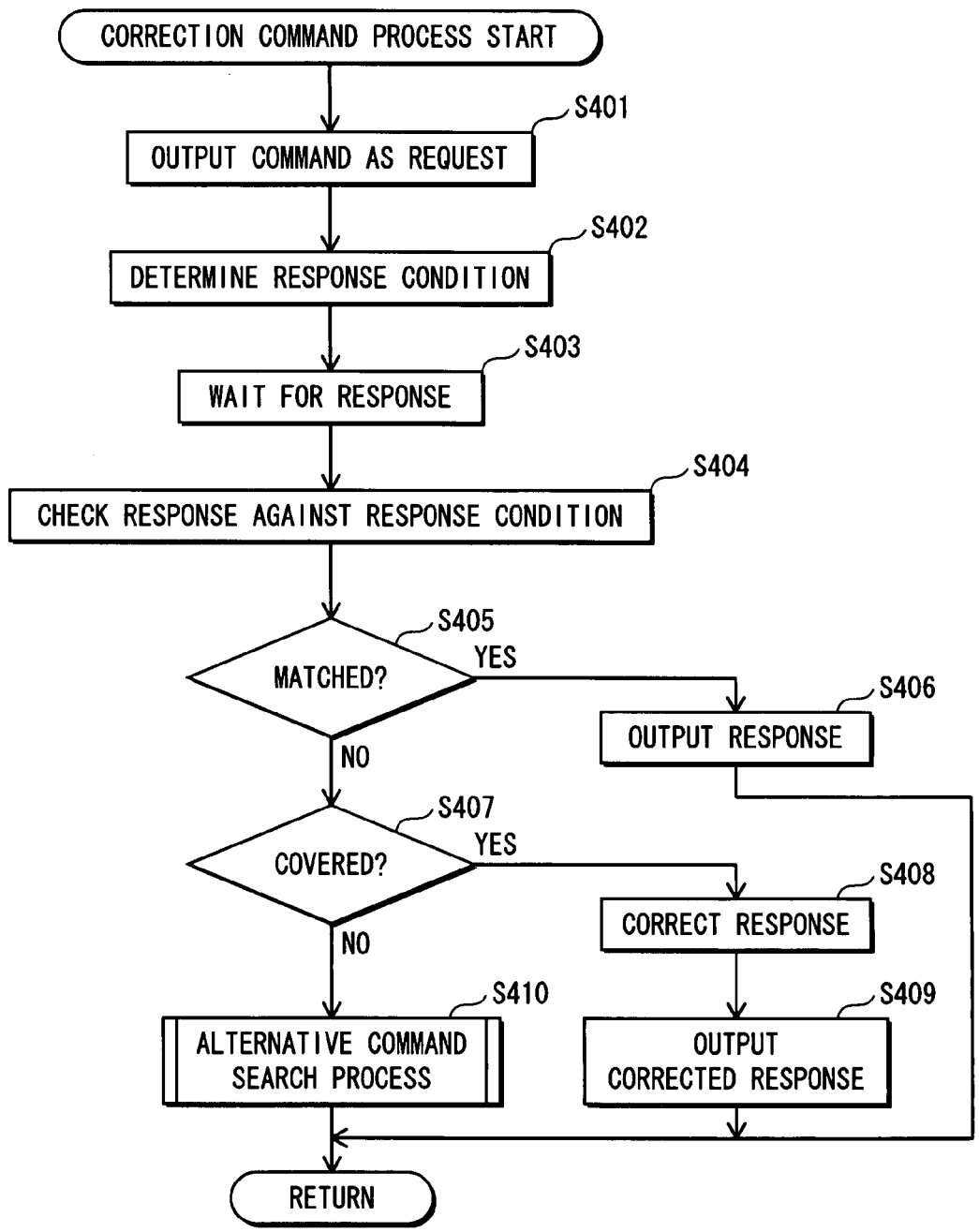
FIG. 12 is a flowchart of a correction command process performed by the adaptive communication processing unit shown in FIG. 4.

The correction command process (step S204) shown in FIG. 10, which is performed by the adaptive communication processing unit 33 shown in FIG. 4, is described below with reference to FIG. 12. FIG. 12 is a flowchart of the correction command process (step S204) shown in FIG. 10.

The request change unit 51 outputs the command received from the communication processing unit 31, directly to the communication processing unit 32 and the response condition determination unit 52 as a request (step S401).

The response condition determination unit 52 extracts a response condition stored in the response condition DB 34 in correspondence with the command received from the request change unit 51, to determine the response condition (step S402).

The adaptive communication processing unit 33 waits for input of a response from the communication processing unit 32 (i.e. a response from the other device-in-communication) (step S403).

When the adaptive communication processing unit 33 receives the response from the communication processing unit 32, the check unit 53 checks the received response against the response condition (step S404).

The judgment control unit 54 judges whether or not the received response matches the response condition, based on a result of the check by the check unit 53 (step S405).

If the response matches the response condition (step S405: YES), the response correction unit 55 outputs the response received from the communication processing unit 32, directly to the communication processing unit 31 (step S406), and returns to the caller.

If the response does not match the response condition (step S405: NO), the judgment control unit 54 judges whether or not the response covers the response condition, that is, whether or not the response is correctable to match the response condition, based on the check result of the check unit 53 (step S407).

If the response does not cover the response condition (step S407: NO), the judgment control unit 54 calls the alternative command search process (FIG. 14) (step S410), and then returns to the caller.

If the response covers the response condition (step S407: YES), the response correction unit 55 corrects the response to match the response condition (step S408), and outputs the corrected response to the communication processing unit 31 (step S409). The response correction unit 55 then returns to the caller.

<Operation of the Adaptive Communication Processing Unit: Normal Command Process>

Figure 13:
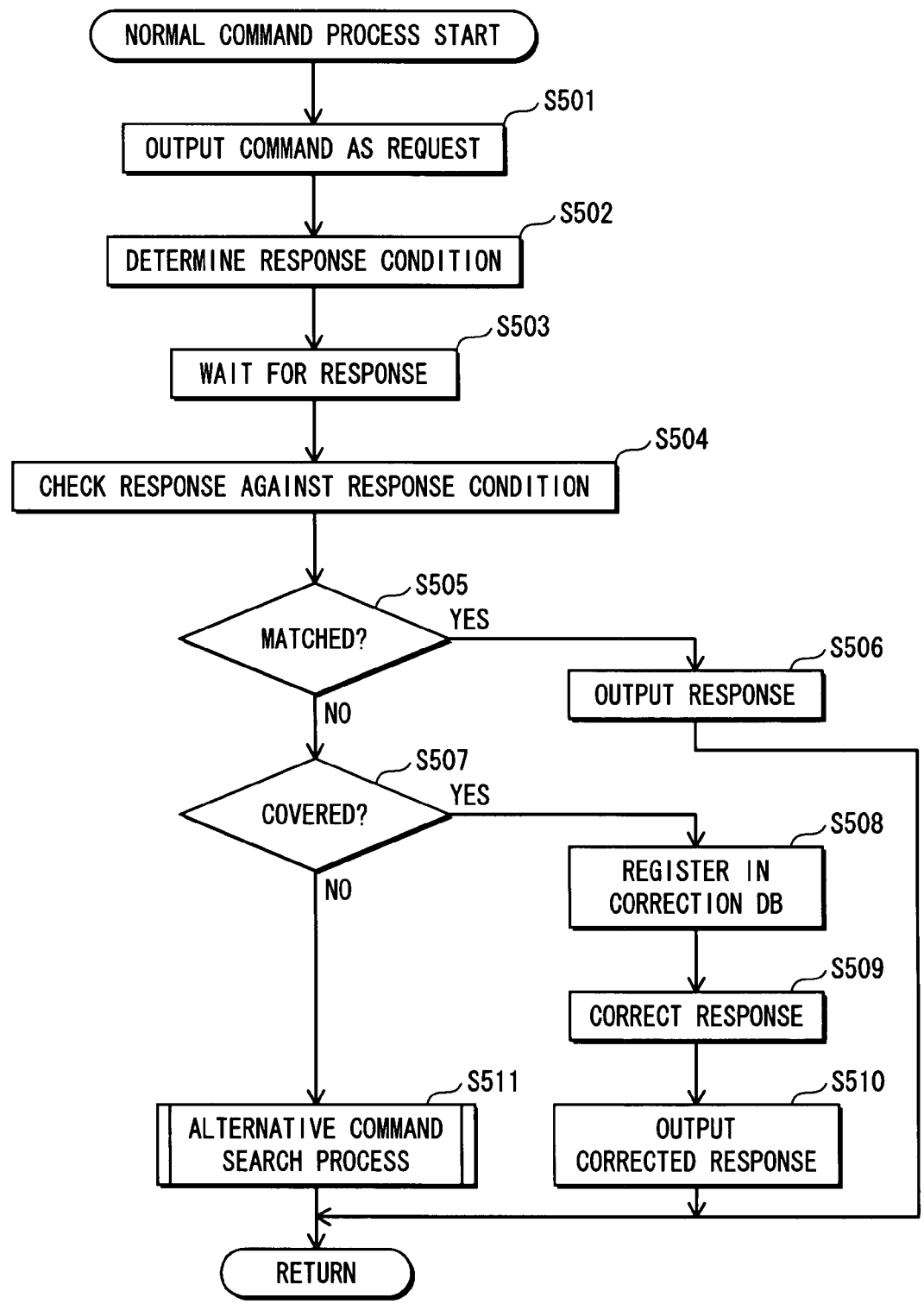
FIG. 13 is a flowchart of a normal command process performed by the adaptive communication processing unit shown in FIG. 4.

The normal command process (step S205) shown in FIG. 10, which is performed by the adaptive communication processing unit 33 shown in FIG. 4, is described below with reference to FIG. 13. FIG. 13 is a flowchart of the normal command process (step S205) shown in FIG. 10.

The request change unit 51 outputs the command received from the communication processing unit 31, directly to the communication processing unit 32 and the response condition determination unit 52 as a request (step S501).

The response condition determination unit 52 extracts a response condition stored in the response condition DB 34 in correspondence with the command received from the request change unit 51, to determine the response condition (step S502).

The adaptive communication processing unit 33 waits for input of a response from the communication processing unit 32 (i.e. a response from the other device-in-communication) (step S503).

When the adaptive communication processing unit 33 receives the response from the communication processing unit 32, the check unit 53 checks the received response against the response condition (step S504).

The judgment control unit 54 judges whether or not the received response matches the response condition, based on a result of the check by the check unit 53 (step S505).

If the response matches the response condition (step S505: YES), the response correction unit 55 outputs the response received from the communication processing unit 32, directly to the communication processing unit 31 (step S506), and then returns to the caller.

If the response-does not match the response condition (step S505: NO), the judgment control unit 54 judges whether or not the response covers the response condition, that is, whether or not the response is correctable to match the response condition, based on the check result of the check unit 53 (step S507).

If the response does not cover the response condition (step S507: NO), the judgment control unit 54 calls the alternative command search process (FIG. 14) (step S511), and then returns to the caller.

If the response covers the response condition (step S507: YES), the judgment control unit 54 registers, the command in the correction DB 36 in correspondence with the request destination communication device (step S508). The response correction unit 55 corrects the response to match the response condition (step S509), outputs the corrected response to the communication processing unit 31 (step S510), and then returns to the caller.

<Operation of the Adaptive Communication Processing Unit: Alternative Command Search Process>

The alternative command search process (steps S321, S410, and S511) shown in FIGS. 11, 12, and 13, which is performed by the adaptive communication processing unit 33 shown in FIG. 4, is described below with reference to FIG. 14. FIG. 14 is a flowchart of the alternative command search process (steps S321, S410, and S511) shown in FIGS. 11, 12, and 13.

The judgment control unit 54 judges whether or not the alternative flag is set (step S601). If the alternative flag is not set (step S601: NO), the judgment control unit 54 proceeds to step S602. If the alternative flag is set (step S601: YES), the judgment control unit 54 proceeds to step S608.

The judgment control unit 54 searches the command DB 35 for an alternative command or an alternative command group corresponding to the command received from the communication processing unit 31 (step S602). The judgment control unit 54 judges whether or not any of the alternative command and the alternative command group is found as a result of the search (step S603).

If none of the alternative command and the alternative command group is found in the command DB 35 (step S603: NO), the response correction unit 55 notifies the communication processing unit 31 of an error (step S607), and then returns to the caller.

If any of the alternative command and the alternative command group is found in the command DB 35 (step S603: YES), the judgment control unit 54 registers the found alternative command or alternative command group in the alternative DB 37 in correspondence with the request destination communication device and the command received from the communication processing unit 31 (step S604). The judgment control unit 54 also sets the alternative flag (step S605). After this, the judgment control unit 54 calls the judgment control process (FIG. 10) (step S606), and then returns to the caller.

The judgment control unit 54 searches the command DB 35 for another alternative command or alternative command group corresponding to the command received from the communication processing unit 31 (step S608). Another alternative command or alternative command group referred to here is an alternative command or alternative command group that is stored in the command DB 35 and has not been used for the request destination communication device as a substitute for the command received from the communication processing unit 31. The judgment control unit 54 judges whether or not any of another alternative command and alternative command group is found in the command DB 35 as a result of the search (step S609).

If none of another alternative command and alternative command group is found in the command DB 35 (step S609: NO), the response correction unit 55 notifies the communication processing unit 31 of an error (step S611), and then returns to the caller.

If any of another alternative command and alternative command group is found in the command DB 35 (step S609: YES), the judgment control unit 54 replaces an alternative command or alternative command group registered in the alternative DB 37 in correspondence with the request destination communication device and the command received from the communication processing unit 31, by another alternative command or alternative command group found as a result of the search (step S610). The judgment control unit 54 also sets the alternative flag (step S605). After this, the judgment control unit 54 calls the judgment control process (FIG. 10) (step S606), and then returns to the caller.

<Specific Example: POP3>
(Operation of the Communication Device: Response Correction)

Figure 15:
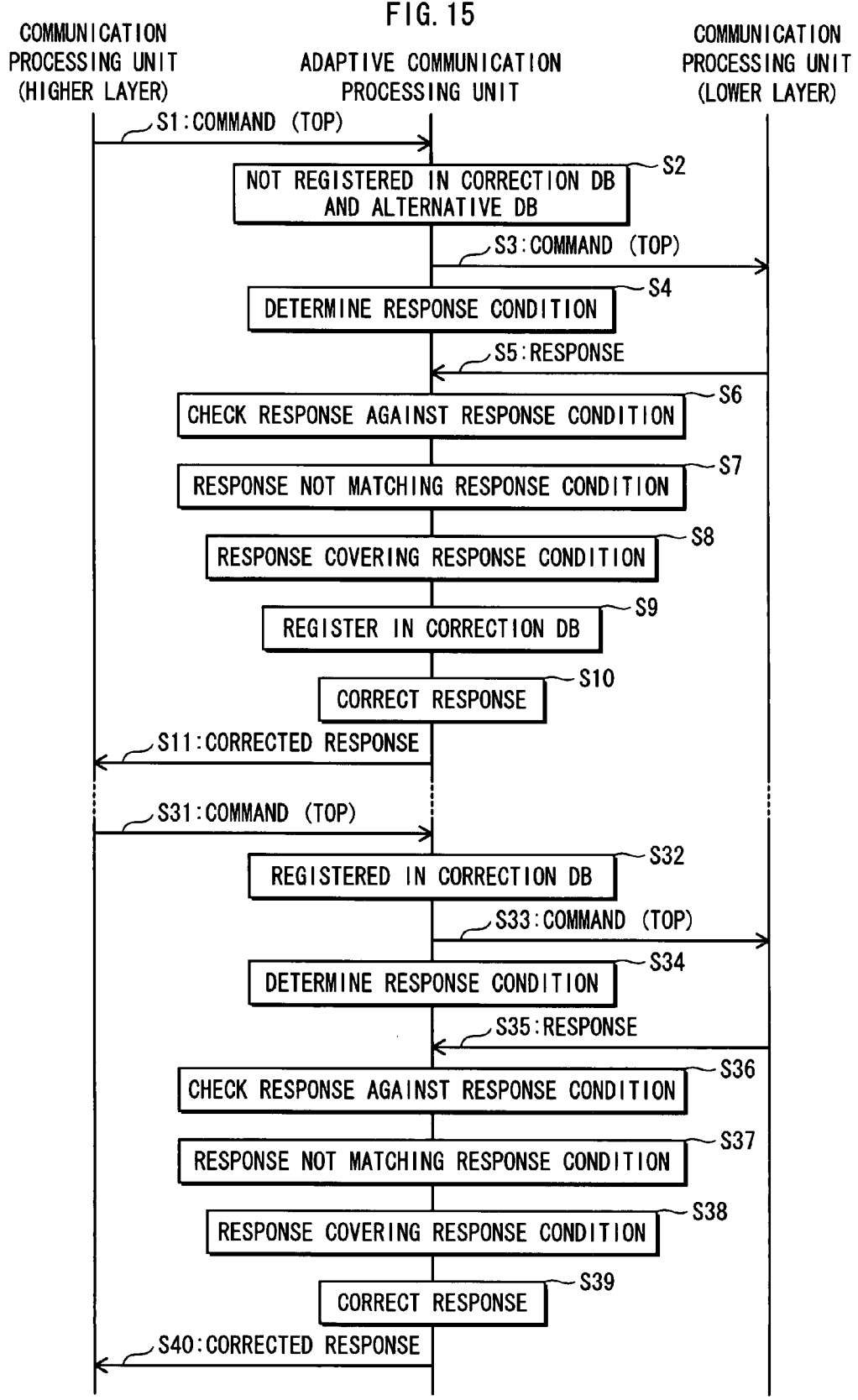
FIG. 15 shows an operation sequence when the communication device shown in FIG. 4 corrects a response to a request.

The following describes an operation of the communication device 1 shown in FIG. 4 when correcting a response to a request, with reference to FIG. 15. FIG. 15 shows an operation sequence when the communication device 1 shown in FIG. 4 corrects a response to a request.

The communication processing unit 31 inputs a TOP command into the adaptive communication processing unit 33 (step S1). The judgment control unit 54 in the adaptive communication processing unit 33 resets the correction flag because the TOP command is not registered in the correction DB 36 in correspondence with the request destination communication device. Also, the judgment control unit 54 resets the alternative flag because the TOP command is not registered in the field "command" in the alternative DB 37 in correspondence with the request destination communication device. Since none of the alternative flag and the correction flag is set, the judgment control unit 54 calls the normal command process (step S2).

The request change unit 51 outputs the TOP command received from the communication processing unit 31, directly to the communication processing unit 32 and the response condition determination unit 52 (step S3). This TOP command is sent from the communication device 1 to the other device-in-communication as a request, as a result of which the communication device 1 receives a response to the TOP command from the other device-in-communication.

The response condition determination unit 52 extracts a response condition stored in the response condition DB 34 in correspondence with the TOP command, to determine the response condition (step S4).

The communication device 1 receives a response to the TOP command from the other device-in-communication, and the communication processing unit 32 inputs the response in the adaptive communication processing unit 33 step S5). The check unit 53 checks the received response against the response condition (step S6).

Suppose the response condition specifies the number of lines of the mail message body to be 5, while the number of lines of the mail message body in the response received from the communication processing unit 32 is 7. In such a case, the judgment control unit 54 judges that the response does not match the response condition (step S7) but the response covers the response condition (step S8). Accordingly, the judgment control unit 54 registers the TOP command in the correction DB 3.6 in correspondence with the request destination communication device (step S9).

The response correction unit 55 corrects the response received from the communication processing unit 32 to match the response condition (step S10), and outputs the corrected response to the communication processing unit 31 (step S11). When the number of lines of the mail message body specified by the response condition is 5 while the number of lines of the mail message body in the received response is 7, the response correction unit 55 corrects the response by deleting 2 lines from the mail message body to make it 5 lines.

Suppose the TOP command is issued again to the same other device-in-communication as in steps S1 to S11.

The communication processing unit 31 inputs the TOP command in the adaptive communication processing unit 33 (step S31). The judgment control unit 54 in the adaptive communication processing unit 33 sets the correction flag because the TOP command is registered in the correction DB 36 in correspondence with the request destination communication device. Meanwhile, the judgment control unit 54 resets the alternative flag because the TOP command is not registered in the alternative DB 37 in correspondence with the request destination communication device. Since the alternative flag is not set but the correction flag is set, the judgment control unit 54 calls the correction command process (step S32).

The request change unit 51 outputs the TOP command received from the communication processing unit 31, directly to the communication processing unit 32 and the response condition determination unit 52 (step S33). This TOP command is sent from the communication device 1 to the other device-in-communication as a request, as a result of which the communication device 1 receives a response to the TOP command from the other device-in-communication.

The response condition determination unit 52 extracts the response condition stored in the response condition DB 34 in correspondence with the TOP command, to determine the response condition (step S34).

The communication device 1 receives a response to the TOP command from the other device-in-communication, and the communication processing unit 32 inputs the response in the adaptive communication processing unit 33 (step S35). The check unit 53 checks the received response against the response condition (step S36).

Suppose the response condition specifies the number of lines of the mail message body to be 5, while the number of lines of the mail message body in the response received from the communication processing unit 32 is 7. In such a case, the judgment control unit 54 judges that the response does not match the response condition (step S37) but the response covers the response condition (step S38).

The response correction unit 55 corrects the response received from the communication processing unit 32 to match the response condition (step S39), and outputs the corrected response to the communication processing unit 31 (step S40).

(Operation of the Communication Device: Command Replacement)

Figure 16:
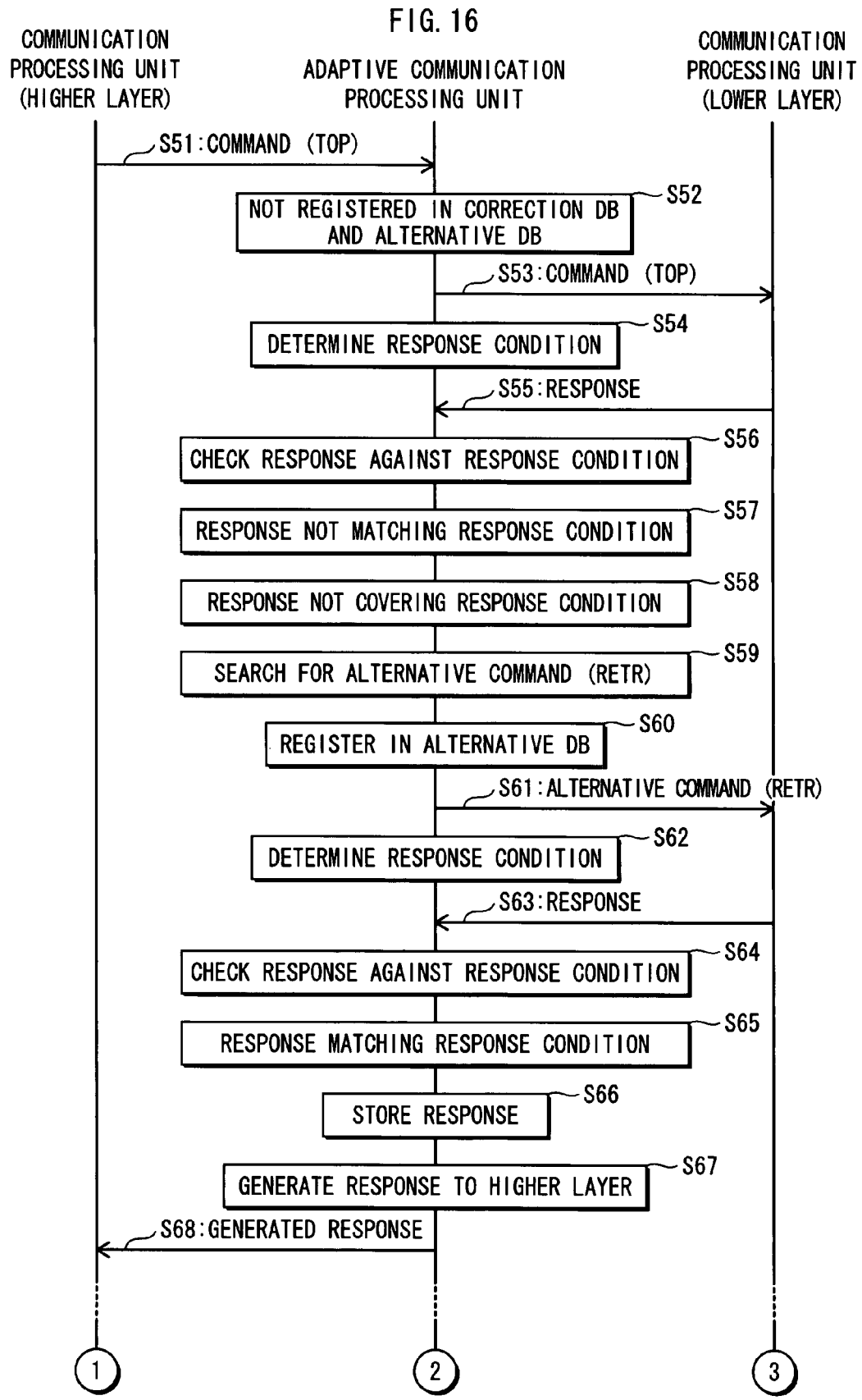
FIG. 16 shows an operation sequence when the communication device shown in FIG. 4 continues communication using an alternative command.
Figure 17:
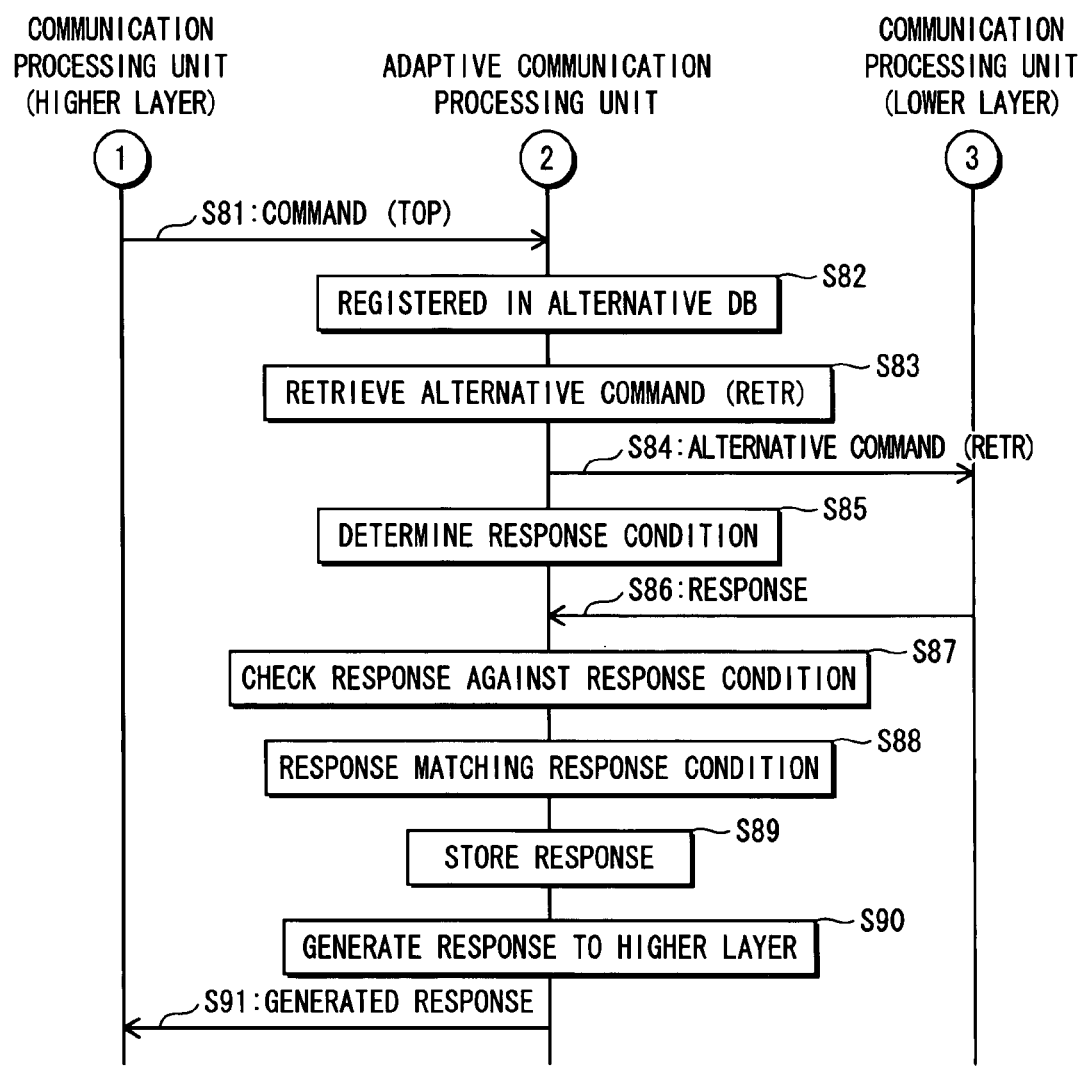
FIG. 17 shows the operation sequence when the communication device shown in FIG. 4 continues communication using an alternative command.

The following describes an operation of the communication device 1 shown in FIG. 4 when continuing communication using an alternative command, with reference to FIGS. 16 and 17. FIGS. 16 and 17 show an operation sequence when the communication device 1 shown in FIG. 4 continues communication using an alternative command.

The communication processing unit 31 inputs the TOP command in the adaptive communication processing unit 33 (step S51). The judgment control unit 54 in the adaptive communication processing unit 33 resets the correction flag because the TOP command is not registered in the correction DB 36 in correspondence with the request destination communication device, and resets the alternative flag because the TOP command is not registered in the field "command" in the alternative DB 37 in correspondence with the request destination communication device. Since none of the alternative flag and the correction flag is set, the judgment control unit 54 calls the normal command process (step S52).

The request change unit 51 outputs the TOP command received from the communication processing unit 31, directly to the communication processing unit 32 and the response condition determination unit 52 (step S53). This TOP command is sent from the communication device 1 to the other device-in-communication as a request, as a result of which the communication device 1 receives a response to the TOP command from the other device-in-communication.

The response condition determination unit 52 extracts a response condition stored in the response condition DB 34 in correspondence with the TOP command, to determine the response condition (step S54).

The communication device 1 receives a response to the TOP command from the other device-in-communication, and the communication processing unit 32 inputs the response in the adaptive communication processing unit 33 (step S55). The check unit 53 checks the received response against the response condition (step S56).

Suppose the response condition specifies the number of lines of the mail message body to be 10, while the number of lines of the mail message body in the response received from the communication processing unit 32 is 7. In such a case, the judgment control unit 54 judges that the response does not match the response condition (step S57), and also the response does not cover the response condition. Accordingly, the judgment control unit 54 calls the alternative command search process (step S58).

The judgment control unit 54 searches the command DB 35 for an alternative command or an alternative command group corresponding to the TOP command (step S59), and registers a RETR alternative command found as a result of the search in the alternative DB 37 in correspondence with the request destination communication device and the TOP command (step S60).

The judgment control unit 54 resets the correction flag because the TOP command is not registered in the correction DB 36 in correspondence with the request destination communication device. Meanwhile, the judgment control unit 54 sets the alternative flag because the TOP command is registered in the field "command" in the alternative DB 37 in correspondence with the request destination communication device. Since the alternative flag is set, the judgment control unit 54 calls the alternative command process.

The request change unit 51 extracts the RETR alternative command stored in the alternative DB 35 in correspondence with the request destination communication device and the TOP command received from the communication processing unit 31, and outputs the RETR alternative command to the communication processing unit 32 and the response condition determination unit 52 (step S61). This RETR alternative command is sent from the communication device 1 to the other device-in-communication as a request, as a result of which the communication device 1 receives a response to the RETR alternative command from the other device-in-communication.

The response condition determination unit 52 extracts a response condition stored in the response condition DB 34 in correspondence with the RETR alternative command, to determine the response condition (step S62).

The communication device 1 receives a response to the RETR alternative command from the other device-in-communication, and the communication processing unit 32 inputs the response in the adaptive communication processing unit 33 (step S63). The check unit 53 checks the received response against the response condition (step S64).

Suppose the received response contains the whole mail message body. In such a case, the judgment control unit 54 judges that the received response matches the response condition (step S65), and the response correction unit 55 stores the received response in the response storage unit 38 (step S66).

The response correction unit 55 generates a response that matches the response condition corresponding to the TOP command received from the communication processing unit 31, by using the response received in reply to the RETR alternative command (step S67). The response correction unit 55 outputs the generated response to the communication processing unit 31 (step S68).

Suppose the TOP command is issued again to the same other device-in-communication as in steps S51 to S68.

The communication processing unit 31 inputs the TOP command in the adaptive communication processing unit 33 (step S81). The judgment control unit 54 in the adaptive communication processing unit 33 resets the correction flag because the TOP command is not registered in the correction DB 36 in correspondence with the request destination communication device. Meanwhile, the judgment control unit 54 sets the alternative flag because the TOP command is registered in the field "command" in the alternative DB 37 in correspondence with the request destination communication device. Since the alternative flag is set, the judgment control unit 54 calls the alternative command process (step S82).

The request change unit 51 extracts the RETR alternative command stored in the alternative DB 37 in correspondence with the request destination communication device and the TOP command received from the communication processing unit 31 (step S83), and outputs the RETR alternative command to the communication processing unit 32 and the response condition determination unit 52 (step S84). This RETR alternative command is sent from the communication device 1 to the other device-in-communication as a request, as a result of which the communication device 1 receives a response to the RETR alternative command from the other device-in-communication.

The response condition determination unit 52 extracts the response condition stored in the response condition DB 34 in correspondence with the RETR alternative command, to determine the response condition (step S85).

The communication device 1 receives a response to the RETR alternative command from the other device-in-communication, and the communication processing unit 32 inputs the response in the adaptive communication processing unit 33 (step S86). The check unit 53 checks the received response against the response condition (step S87).

Suppose the received response contains the whole mail message body. In such a case, the judgment control unit 54 judges that the received response matches the response condition (step S88), and the response correction unit 55 stores the received response in the response storage unit 38 (step S89).

The response correction unit 55 generates a response that matches the response condition corresponding to the TOP command received from the communication processing unit 31, by using the response received in reply to the RETR alternative command (step S90). The response correction unit 55 outputs the generated response to the communication processing unit 31 (step S91).

Second Embodiment

The following describes a second embodiment of the present invention with reference to drawings.

The second embodiment adds a function of restricting the execution of each of the response correction and the continued communication using an alternative command or an alternative command group, to the first embodiment.

In this embodiment, construction elements and processing steps that are the same as those in the first embodiment have been given the same reference numerals, and their explanation has been omitted.

<Device Construction of the Communication Device>

Figure 18:
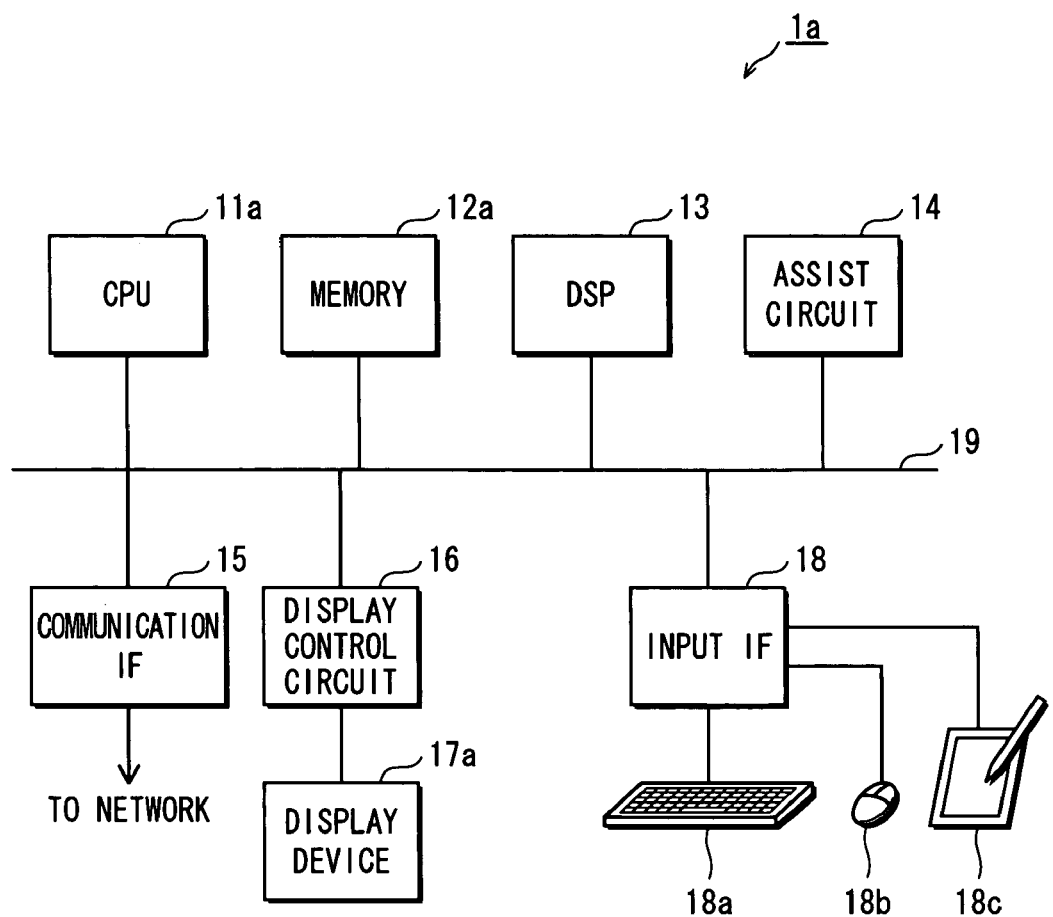
FIG. 18 shows a device construction of a communication device according to a second embodiment of the present invention.

A device construction of a communication device 1*a* according to this embodiment is described below, with reference to FIG. 18. FIG. 18 shows the device construction of the communication device 1*a* according to this embodiment.

The communication device 1*a* includes a CPU 11*a*, a memory 12*a*, the DSP 13, the assist circuit 14, the communication interface (communication IF) 15, the display control circuit 16, a display device 17*a*, the input interface (input IF) 18, the keyboard 18*a*, the mouse 18*b*, and the tablet 18*c*. The CPU 11*a*, the memory 12*a*, the DSP 13, the assist circuit 14, the communication IF 15, the display control circuit 16, and the input IF 18 are each connected to the bus 19.

A restriction level setting screen is displayed on the display device 17*a*. Also, a restriction level designated by the user on the restriction level setting screen is stored on the memory 12*a* by the CPU 11*a*.

<Restriction Level Setting Screen>

Figure 19:
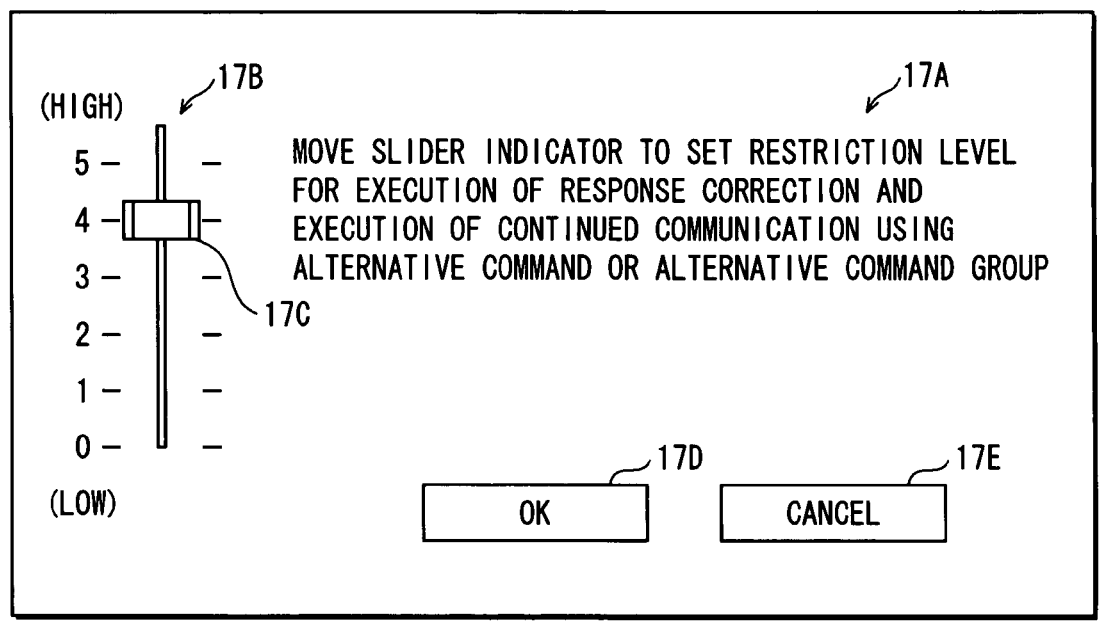
FIG. 19 shows an example of a restriction level setting screen displayed on a display device shown in FIG. 18.

The restriction level setting screen displayed on the display device 17a shown in FIG. 18 is explained below, with reference to FIG. 19. FIG. 19 shows an example of the restriction level setting screen displayed on the display device 17a shown in FIG. 18.

The restriction level setting screen includes a message 17A "MOVE SLIDER INDICATOR TO SET RESTRICTION LEVEL FOR EXECUTION OF RESPONSE CORRECTION AND EXECUTION OF CONTINUED COMMUNICATION USING ALTERNATIVE COMMAND OR ALTERNATIVE COMMAND GROUP".

The restriction level setting screen also includes a slider 17B. The user can designate a restriction level by moving an indicator 17C on the slider 17B using the mouse 18b and the like. The restriction level is used to restrict the execution of the response correction and the execution of the continued communication using an alternative command or an alternative command group:

The slider 17B and the indicator 17C allow the user to designate six restriction levels. The restriction level decreases from the top to bottom of the screen. Levels "5", "4", ..., "1", and "0" are assigned to the restriction levels in descending order.

Suppose the restriction level represents the degree of risk. In this case, the restriction level "5" indicates a safest level (a lowest degree of risk), whereas the restriction level "0" indicates a least safe level (a highest degree of risk).

The restriction level setting screen also includes an OK button 17D for restriction level determination and a CANCEL button 17E for cancellation.

<Operation of the CPU: Restriction Level Reception Processing>

Figure 20:
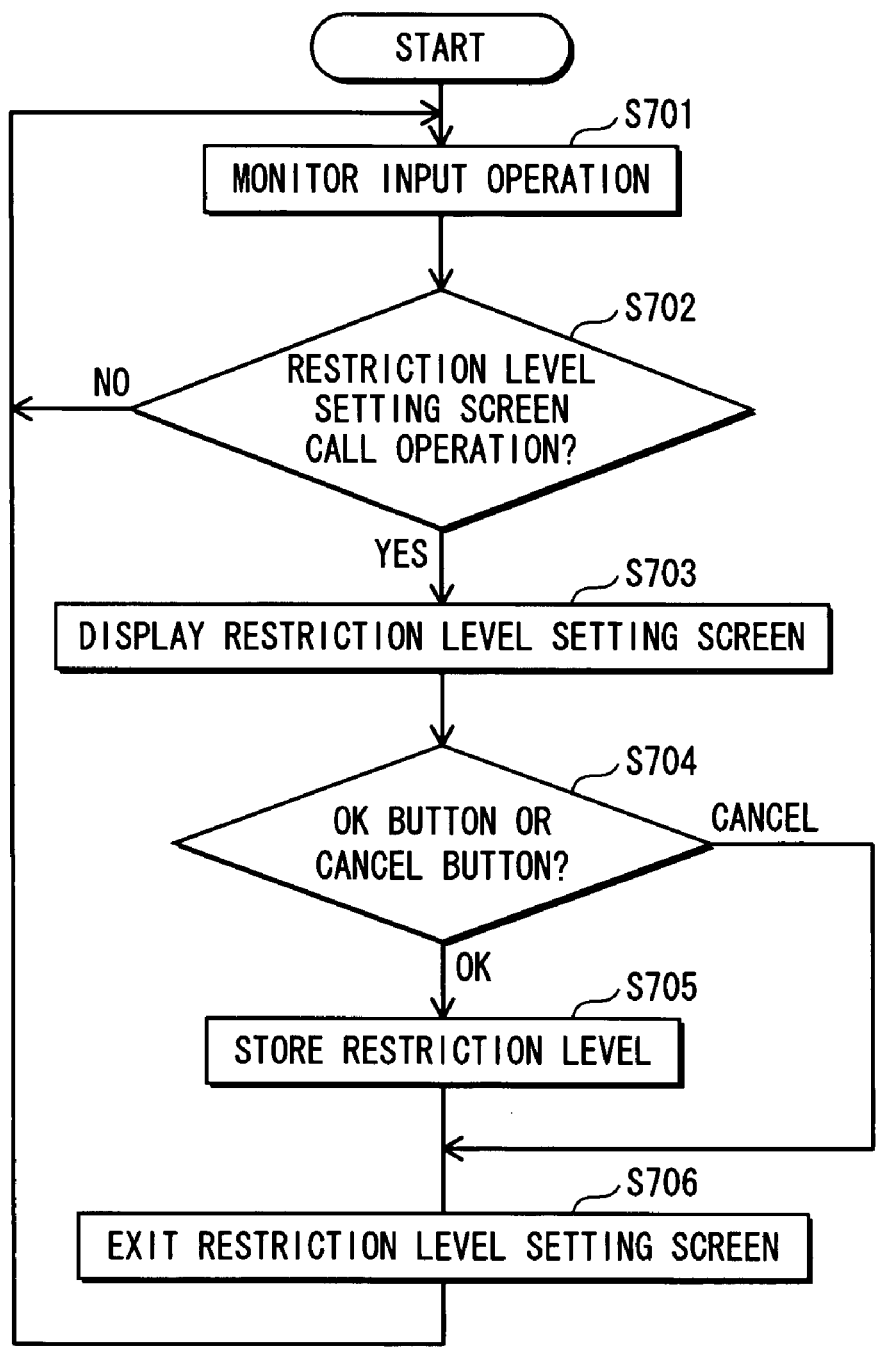
FIG. 20 is a flowchart of a restriction level acceptance process performed by a CPU shown in FIG. 18.

A restriction level storage process performed by the CPU 11a shown in FIG. 18 is described below, with reference to FIG. 20. FIG. 20 is a flowchart of a restriction level reception process performed by the CPU 11a shown in FIG. 18.

The CPU 11a monitors an input operation by the user, based on an input signal received from the keyboard 18a, the mouse 18b, and the like via the input IF 18 (step S701).

The CPU 11a judges whether or not the user's input operation is an operation to call the restriction level setting screen, based on the input signal (step S702). If the restriction level setting screen call operation is not performed (step S702: NO), the CPU 11a returns to step S701.

If the restriction level setting screen call operation is performed (step S702: YES), the CPU 11a controls the display control circuit 16 to display the restriction level setting screen such as the one shown in FIG. 19, on the display device 17a (step S703).

The user moves the indicator 17C and presses the OK button 17D or the CANCEL button 17E by using the mouse 18b and the like, on the restriction level setting screen.

The CPU 11a judges whether the OK button 17D or the CANCEL button 17E is pressed by the user, based on an input signal received from the mouse 18b and the like via the input IF 18 (step S704).

If the OK button 17D is pressed (step S704: OK), the CPU 11a specifies a restriction level based on the position of the indicator 17C, and stores the specified restriction level in a restriction level storage unit 39 (described later) of the memory 12a (step S705). The CPU 11a then controls the display control circuit 16 to exit the display of the restriction level setting screen (step S706), and returns to step S701.

If the CANCEL button 17E is pressed (step S704: CANCEL), the CPU 11a controls the display control circuit 16 to exit the display of the restriction level setting screen (step S706), and returns to step S701.

<Functional Construction of the Communication Device>

Figure 21:
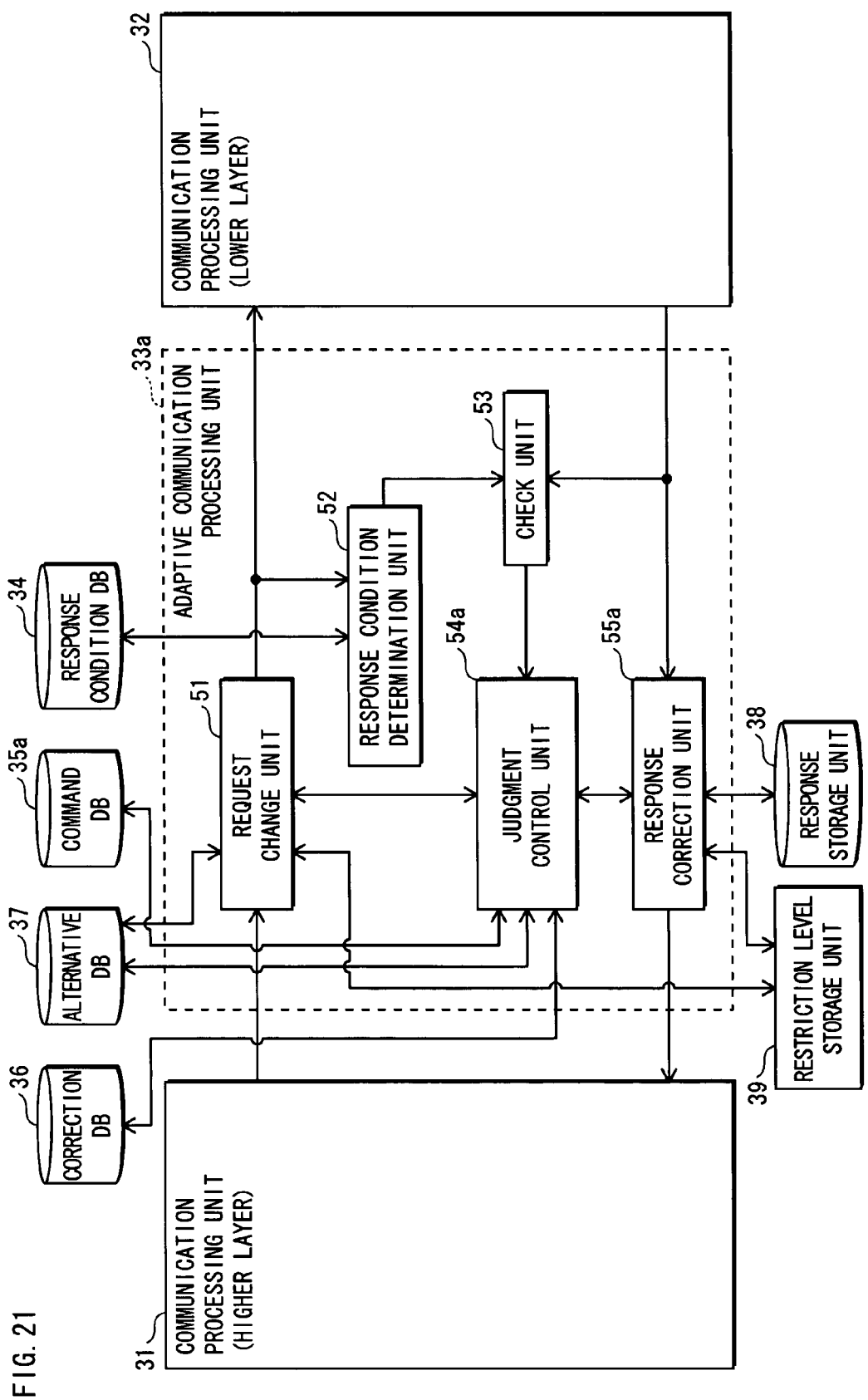
FIG. 21 shows a functional construction of the communication device shown in FIG. 18.

A functional construction of the communication device 1a shown in FIG. 18 is described below, by referring to FIG. 21. FIG. 21 shows the functional construction of the communication device 1a shown in FIG. 18.

The communication device 1a includes the communication processing units 31 and 32, an adaptive communication processing unit 33a, the response condition database (response condition DB) 34, a command database (command DB) 35a, the correction database (correction DB) 36, the alternative database (alternative DB) 37, the response storage unit 38, and the restriction level storage unit 39.

The adaptive communication processing unit 33a is located between the communication processing units 31 and 32, and relays communication between the communication processing units 31 and 32. Functions of the adaptive communication processing unit 33a will be described in detail later.

The command DB 35a stores, in correspondence with each command, a pair of an alternative command or an alternative command group made up of a plurality of alternative commands, that substitutes for the command, and an alternative operation level. FIG. 22 shows an example of this. If an alternative operation level corresponding to an alternative command or an alternative command group exceeds the restriction level, continued communication using the alternative command or the alternative command group is executed.

In the example of FIG. 22, a pair of an alternative command or alternative command group that substitutes for a command stored in the field "command", and an alternative operation level are stored in the fields "alternative (1)", "alternative (2)", and "alternative (3)". Each of the fields "alternative (1)", "alternative (2)", and "alternative (3)" has an area for storing an alternative command or an alternative command group and an area for storing an alternative operation level.

The restriction level storage unit 39 stores the restriction level determined as a result of the restriction level reception process shown in FIG. 20.

<Functional Construction of the Adaptive Communication Processing Unit>

The adaptive communication processing unit 33a functions as the request change unit 51, the response condition determination unit 52, the check unit 53, a judgment control unit 54a, and a response correction unit 55a.

The judgment control unit 54a controls the request change unit 51 based on the storage contents of the correction DB 36 and the alternative DB 37, and controls the response correction unit 55a based on the storage contents of the correction DB 36 and the alternative DB 37 and the check result of the check unit 53.

The judgment control unit 54a searches the command DB 35 for an alternative command or an alternative command group, in accordance with the check result received from the check unit 53. If an alternative operation level of the alternative command or alternative command group found as a result of the search exceeds the restriction level stored in the restriction level storage unit 39, the judgment control unit 54a stores the alternative command or alternative command group found as a result of the search, in the alternative DB 37 in correspondence with the request destination communication device and the command input from the communication processing unit 31 into the adaptive communication processing unit 33a.

The response correction unit 55a is controlled by the judgment control unit 54a, and outputs the response received from the communication processing unit 32 directly to the communication processing unit 31 or, if a correction operation level exceeds the restriction level stored in the restriction level storage unit 39, corrects the received response to match the response condition and outputs the corrected response to the communication processing unit 31.

Also, the response correction unit 55a stores the response received from the communication processing unit 32 directly in the response storage unit 38 or, if the correction operation level exceeds the restriction level stored in the restriction level storage unit 39, corrects the received response to match the response condition and stores the corrected response in the response storage unit 38, under control of the judgment control unit 54a. The response correction unit 55a generates a response that matches the response condition corresponding to the command which is input from the communication processing unit 31 into the adaptive communication processing unit 33a, based on the response stored in the response storage unit 38, and outputs the generated response to the communication processing unit 31.

<Operation of the Adaptive Communication Processing Unit>

An operation of the adaptive communication processing unit 33a is described below.

The adaptive communication processing unit 33a performs the substantially same request input process and judgment control process as those shown in the flowcharts of FIGS. 9 and 10.

In this embodiment, the judgment control process flow shown in FIG. 10 is called in the judgment control process (step S108) in FIG. 9.

Figure 23:
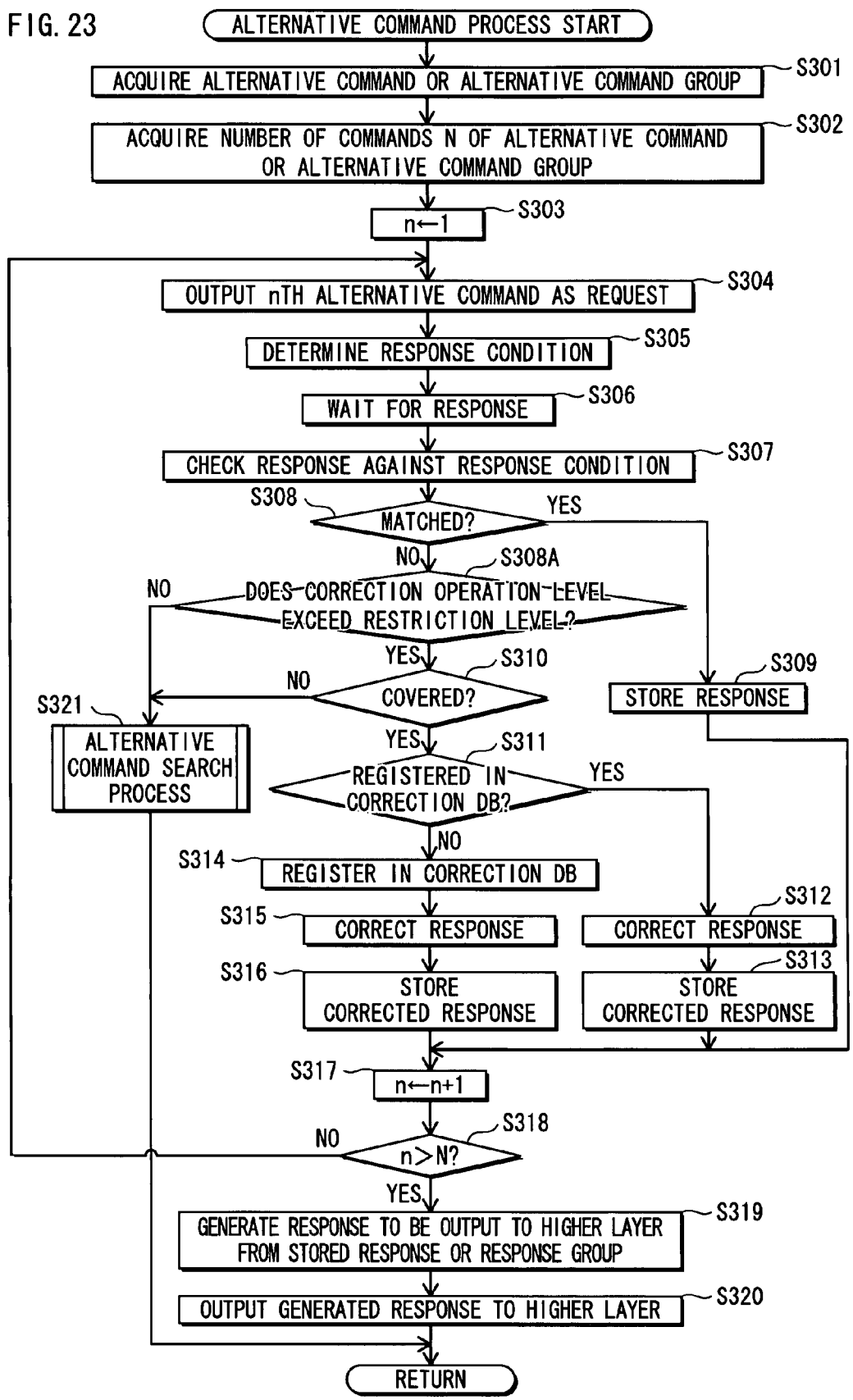
FIG. 23 is a flowchart of an alternative command process performed by an adaptive communication processing unit shown in FIG. 21.
Figure 24:
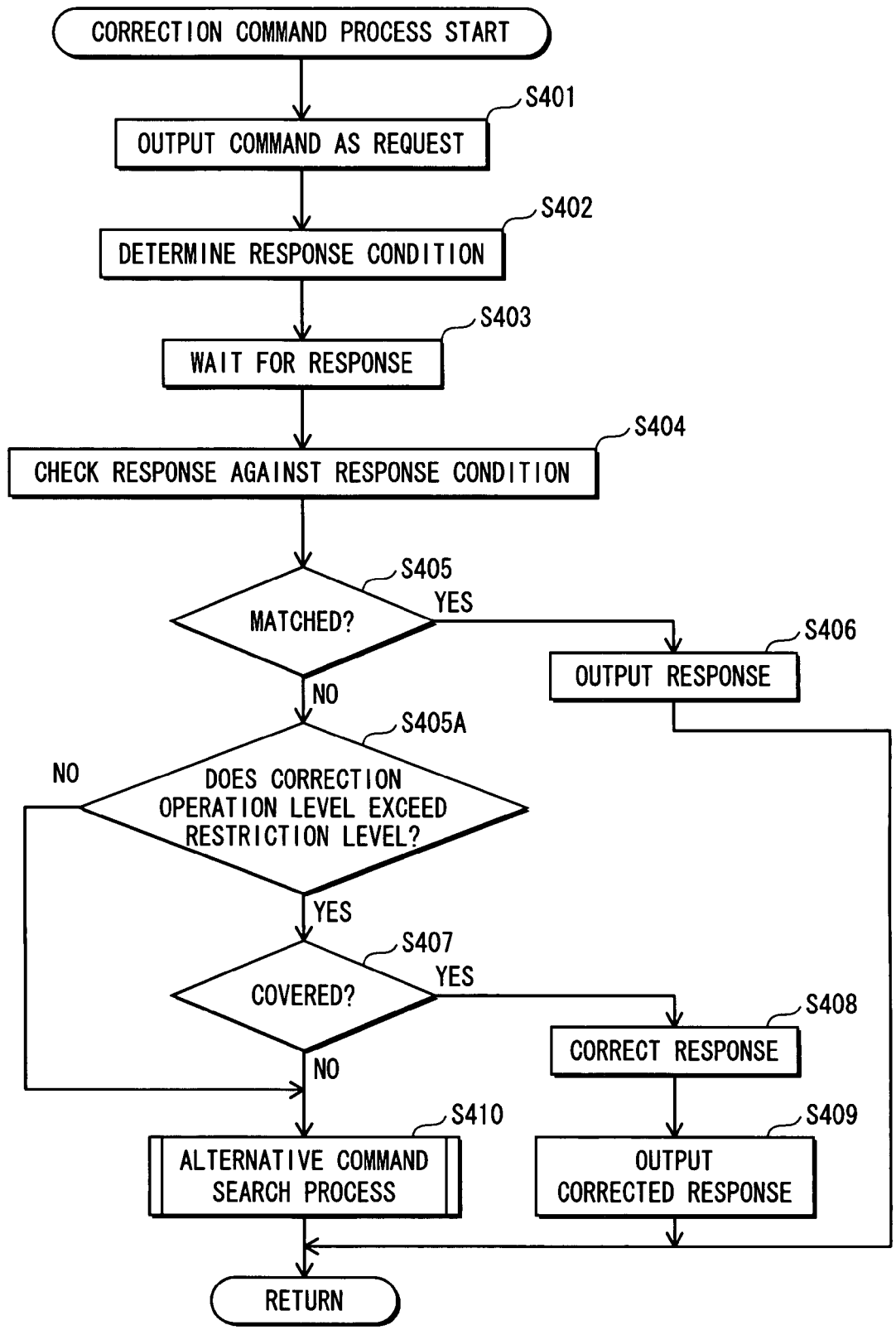
FIG. 24 is a flowchart of a correction command process performed by the adaptive communication processing unit shown in FIG. 21.
Figure 25:
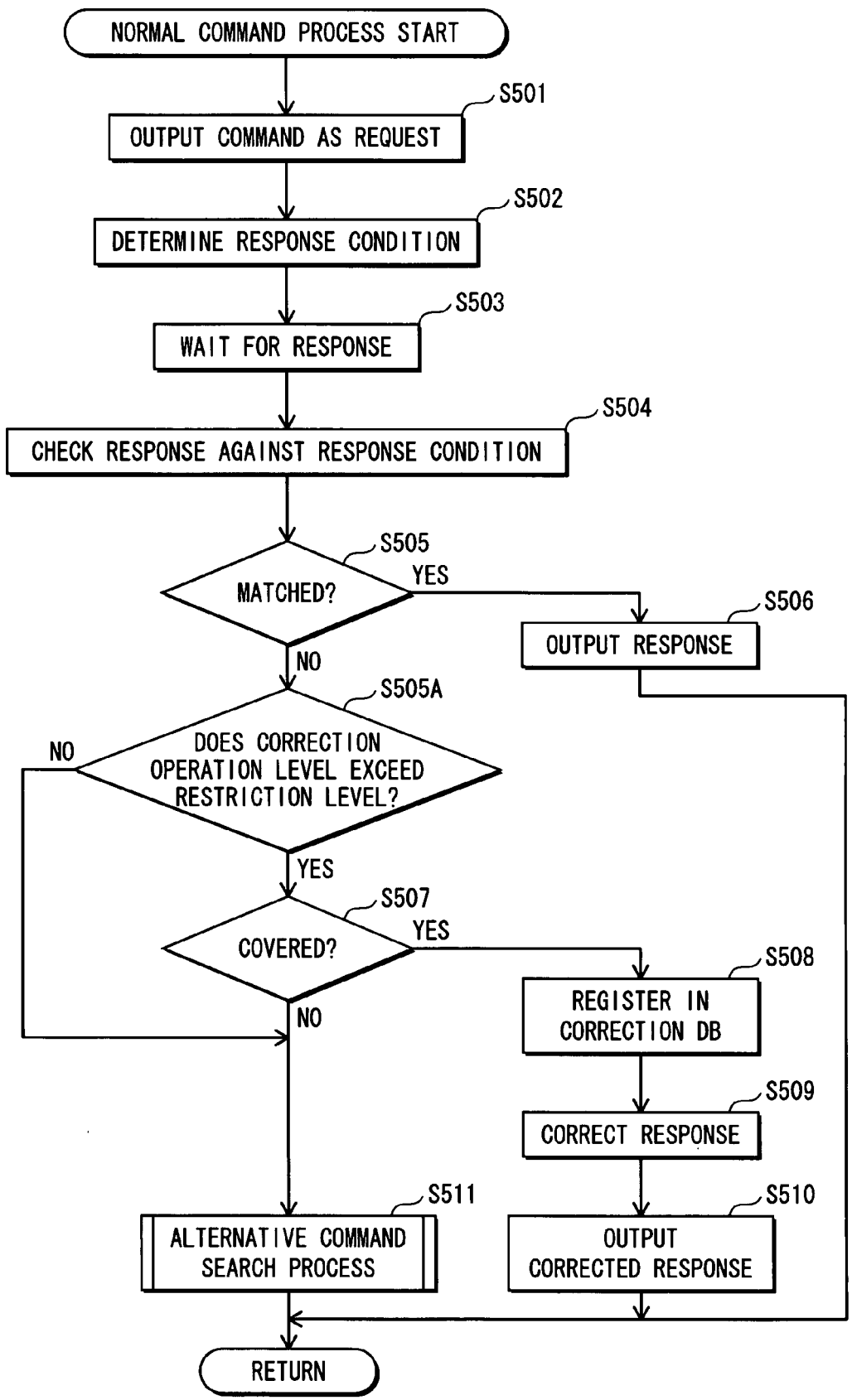
FIG. 25 is a flowchart of a normal command process performed by the adaptive communication processing unit shown in FIG. 21.

Also, an alternative command process flow shown in FIG. 23 is called in the alternative command process (step S203) in FIG. 10, a correction command process flow shown in FIG. 24 is called in the correction command process (step S204) in FIG. 10, an a normal command process flow shown in FIG. 25 is called in the normal command process (step S205) in FIG. 10.

<Operation of the Adaptive Communication Processing Unit: Alternative Command Process>

The alternative command process (step S203) shown in FIG. 10, which is performed by the adaptive communication processing unit 33a shown in FIG. 21, is described below with reference to FIG. 23. FIG. 23 is a flow chart of the alternative command process (step S203) shown in FIG. 10.

The alternative command process flow shown in FIG. 23 adds a step of judging whether or not to execute the response correction, before the step of judging whether or not the response covers the response condition (step S310) in the alternative command process flow of FIG. 11.

Figure 26:
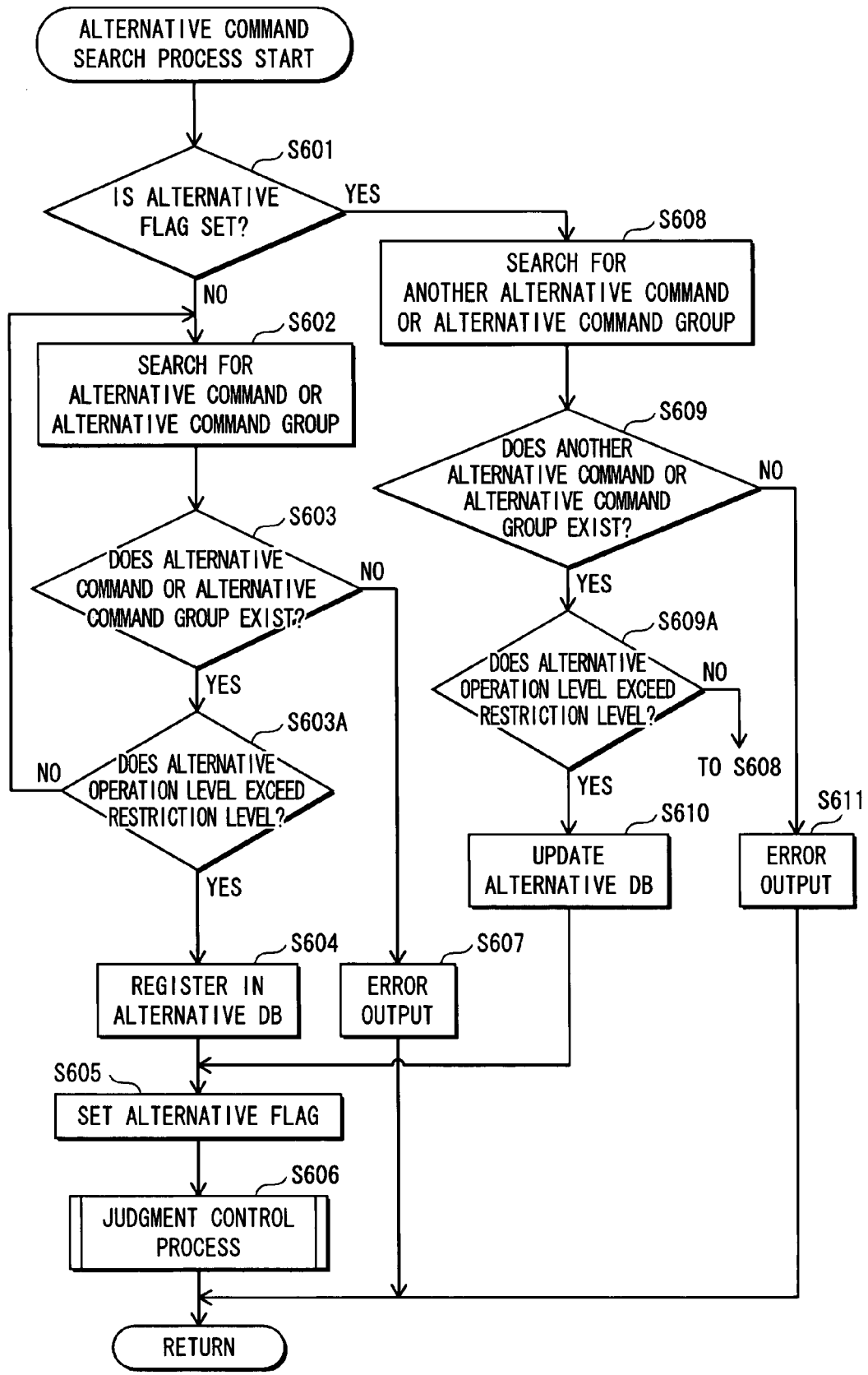
FIG. 26 is a flowchart of an alternative command search process performed by the adaptive communication processing unit shown in FIG. 21.

Note that an alternative command search process flow shown in FIG. 26 is called in the alternative command search process (step S321) in FIG. 23.

When the judgment control unit 54a judges that the response does not match the response condition in step S308 (step S308: NO) the response correction unit 55a judges whether or not the correction operation level set in advance exceeds the restriction level stored in the restriction level storage unit 39 (step S308A).

If the correction operation level exceeds the restriction level (step S308A: YES), the judgment control unit 54a proceeds to step S310. If the correction operation level is no higher than the restriction level (step S308A: NO), the judgment control unit 54a proceeds to step S321.

<Operation of the Adaptive Communication Processing Unit: Correction Command Process>

The correction command process (step S204) shown in FIG. 10, which is performed by the adaptive communication processing unit 33a shown in FIG. 21, is described below with reference to FIG. 24. FIG. 24 is a flow chart of the correction command process (step S204) shown in FIG. 10.

The correction command process flow shown in FIG. 24 adds a step of judging whether or not to execute the response correction, before the step of judging whether or not the response covers the response condition (step S407) in the correction command process flow of FIG. 12.

Note that the alternative command search process flow shown in FIG. 26 is called in the alternative command search process (step S410) in FIG. 24.

When the judgment control unit 54a judges that the response does not match the response condition in step S405 (step S405: NO), the response correction unit 55a judges whether or not the correction operation level set in advance exceeds the restriction level stored in the restriction level storage unit 39 (step S405A).

If the correction operation level exceeds the restriction level (step S405A: YES), the judgment control unit 54a proceeds to step S407. If the correction operation level is no higher than the restriction level (step S405A: NO), the judgment control unit 54a proceeds to step S410.

<Operation of the Adaptive Communication Processing Unit: Normal Command Process>

The normal command process (step S205) shown in FIG. 10, which is performed by the adaptive communication processing unit 33a shown in FIG. 21, is described below with reference to FIG. 25. FIG. 25 is a flowchart of the normal command process (step S205) shown in FIG. 10.

The normal command process flow shown in FIG. 25 adds a step of judging whether or not to execute the response correction, before the step of judging whether or not the response covers the response condition (step S507) in the normal command process flow of FIG. 13.

Note that the alternative command search process flow shown in FIG. 26 is called in the alternative command search process (step S511) in FIG. 25.

When the judgment control unit 54a judges that the response does not match the response condition in step S505 (step S505: NO), the response correction unit 55a judges whether or not the correction operation level set in advance exceeds the restriction level stored in the restriction level storage unit 39 (step S505A).

If the correction operation level exceeds the restriction level (step S505A: YES), the judgment control unit 54a proceeds to step S507. If the correction operation level is no higher than the restriction level (step S505A: NO), the judgment control unit 54a proceeds to step S511.

<Operation of the Adaptive Communication Processing Unit: Alternative Command Search Process>

The alternative command search process (steps S321, S410, and S511) shown in FIGS. 23, 24, and 25, which is performed by the adaptive communication processing unit 33a shown in FIG. 21, is described below with reference to FIG. 26. FIG. 26 is a flowchart of the alternative command search process (steps S321, S410, and S511) shown in FIGS. 23, 24, and 25.

Figure 14:
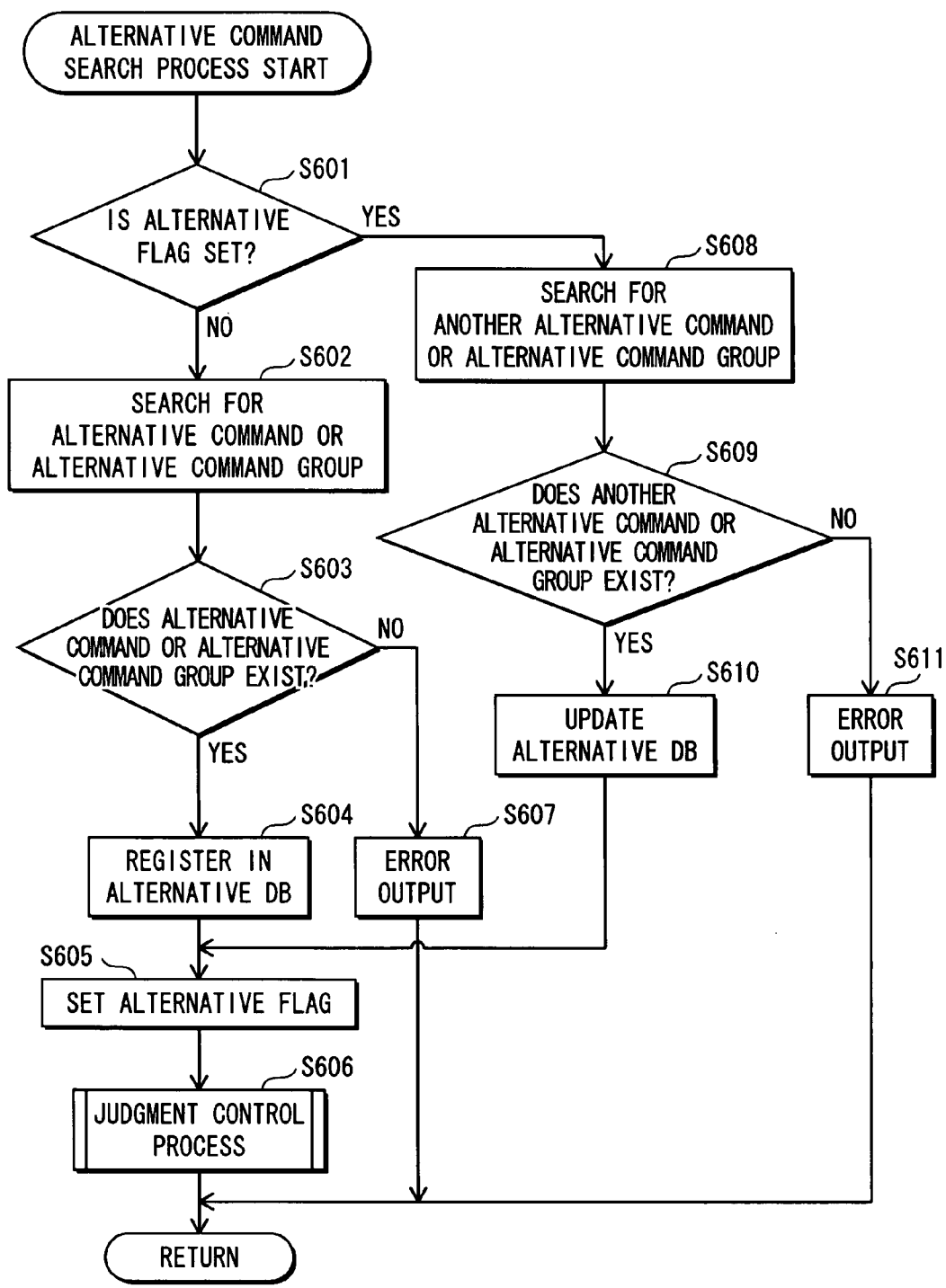
FIG. 14 is a flowchart of an alternative command search process performed by the adaptive communication processing unit shown in FIG. 4.

The alternative command search process flow shown in FIG. 26 adds the following two judgment steps to the alternative command search process flow of FIG. 14.

The first judgment step judges, after the judgment that any of an alternative command and an alternative command group exists (step S603: YES), whether or not to execute the communication using the alternative command or alternative command group found as a result of the search.

The second judgment step judges, after the judgment that any of another alternative command and another alternative command group exists (step S609: YES), whether or not to execute the communication using another alternative command or alternative command group found as a result of the search.

When the judgment control unit 54a judges that any of an alternative command and an alternative command group exists in step S603 (step S603: YES), the judgment control unit 54a acquires an alternative operation level of the alternative command or alternative command group found as a result of the search, with reference to the command DB 35a. The judgment control unit 54a then judges whether or not the acquired alternative operation level exceeds the restriction level stored in the restriction level storage unit 39 (step S603A).

If the alternative operation level exceeds the restriction level (step S603A: YES), the judgment control unit 54a proceeds to step S604. If the alternative operation level is no higher than the restriction level (step S603A: NO), the judgment control unit 54a returns to step S602.

In the case where the alternative operation level exceeds the restriction level (step S603A: YES), the alternative command or alternative command group found as a result of the search is stored in the alternative DB 37, and the alternative command process flow shown in FIG. 23 is executed through the judgment control process flow shown in FIG. 10. Which is to say, the judgment step of step S603A is equivalent to the step of judging whether or not to execute the communication using the alternative command or alternative command group found as a result of the search.

When the judgment control unit 54a judges that any of another alternative command and another alternative command group exists in step S609 (step S609: YES), the judgment control unit 54a acquires an alternative operation level of another alternative command or alternative command group found as a result of the search, with reference to the command DB 35a. The judgment control unit 54a then judges whether or not the acquired alternative operation level exceeds the restriction level stored in the restriction level storage unit 39 (step S609A).

If the alternative operation level exceeds the restriction level (step S609A: YES), the judgment control unit 54a proceeds to step S610. If the alternative operation level is no higher than the restriction level (step S609A: NO), the judgment control unit 54a returns to step S608.

In the case where the alternative operation level exceeds the restriction level (step S609A: YES), another alternative command or alternative command group found as a result of the search is stored in the alternative DB 37, and the alternative command process flow shown in FIG. 23 is executed through the judgment control process flow shown in FIG. 10. Which is to say, the judgment step of step S609A is equivalent to the step of judging whether or not to execute the communication using another alternative command or alternative command group found as a result of the search.

<Specific Example>

A specific example is given below.

Suppose the correction operation level is set to "1", command a has alternative commands a1 and a2 whose alternative operation levels are respectively "2" and "4", and the communication processing unit 31 inputs command a in the adaptive communication processing unit 33a.

(1) When the restriction level is set to "0" by the user, the communication device 1a operates as follows.

The correction operation level "1" exceeds the restriction level "0", so that the response correction is performed according to need. Also, the alternative operation level "2" of alternative command a1 and the alternative operation level "4" of alternative command a2 both exceed the restriction level "0", so that the communication using alternative command a1 and the communication using alternative command a2 are performed according to need.

(2) When the restriction level is set to "1" by the user, the communication device 1a operates as follows.

The correction operation level "1" does not exceed the restriction level "1", so that the response correction is not performed. Meanwhile, the alternative operation level "2" of alternative command a1 and the alternative operation level "4" of alternative command a2 both exceed the restriction level "1", so that the communication using alternative command a1 and the communication using alternative command a2 are performed according to need.

(3) When the restriction level is set to "2" by the user, the communication device 1a operates as follows.

The correction operation level "1" does not exceed the restriction level "2", so that the response correction is not performed. Also, the alternative operation level "2" of alternative command a1 does not exceed the restriction level "2", so that the communication using alternative command a1 is not performed. Meanwhile, the alternative operation level "4" of alternative command a2 exceeds the restriction level "2", and so the communication using alternative command a2 is performed according to need.

(4) When the restriction level is set to "5" by the user, the communication device 1a operates as follows.

The correction operation level "1" does not exceed the restriction level "5", so that the response correction is not performed. Also, both the alternative operation level "2" of alternative command a1 and the alternative operation level "4" of alternative command a2 do not exceed the restriction level "5", and so the communication using alternative command a1 and the communication using alternative command a2 are not performed.

According to this embodiment, the user can decide whether or not to perform the response correction and to what extent the communication using an alternative command or an alternative command group is to be performed.

<Supplementary Remarks>

Though the present invention has been described by way of the above embodiments, the present invention is not limited to the above. For example, the following modifications are applicable.

(1) The above embodiments describe the case where the TCP/IP layer model is used as an example, but this is not a limit for the present invention, which can be equally applied to other models.

(2) The above embodiments describe the case where the processing target protocol is POP3 or the like and the functions of the present invention are provided between the protocol such as POP3 and TCP or UDP. However, the present invention is not limited to this, as the functions of the present invention can be provided between any processing target protocol and a protocol located at its lower layer.

(3) The above embodiments describe the case where the functions of the present invention are provided between a protocol such as POP3 and TCP or UDP, but the present invention is not limited to such. The functions of the present invention may be incorporated in the processing target protocol. Also, the functions of the present invention may be incorporated in the protocol that is located at a lower layer of the processing target protocol.

(4) The first embodiment describes the case where the command DB 35 is generated beforehand, but the present invention is not limited to such. For example, the command DB may be automatically generated using an inference mechanism.

Let A be a set of all communication commands, func (x) be a function of communication command x, and FUNC (x, y, . . . ) be a function that combines communication commands x, y, . . . .

Command a (a∈A) can be substituted by command b (b∈B) where func(a) ⊆func (b). Also, command a (a∈A) can be substituted by command group x, y, . . . (x, y, . . . ∈B) where func (a) ⊆func (x, y, . . . ).

By searching the response condition DB 34 based on the above rule, it is possible to generate an alternative command or an alternative command group composed of a plurality of alternative commands, that can substitute for command a.

For instance, in the case of POP, the relations func (TOP) ⊆func (RETR) and func (LIST) ⊆func (STAT) can be discovered according to an inference mechanism using a predicate logic. As a result, it can be understood that TOP is replaceable by RETR and LIST is replaceable by STAT.

(5) The functions of the present invention can be applied to various communication such as communication between a device such as a personal computer and a device such as a server, communication between a personal computer and a peripheral device, communication between LSIs (Large Scale Integration), and intra-chip communication, so long as they involve sending/receiving a request and a response to the request.

For instance, the functions of the present invention are applicable to communication by a HDD interface such as ATAPI (AT Attachment Packet Interface) or Serial ATAPI, communication on USB or Bluetooth, and intra-chip communication according to a protocol of a serial bus such as I2C (Inter-Integrated Circuit).

(6) The above embodiments describe the case where the storage of the correction DB 36 and the alternative DB 37 is performed in units of communication devices, but this is not a limit for the present invention. As one example, in a situation where a device model name is obtainable, the storage of the correction DB 36 and the alternative DB 37 may be performed in units of models of communication devices.

(7) The above embodiments describe the case where the response is corrected to match the response condition if the response does not match the response condition but covers the response condition. Alternatively, an alternative command or an alternative command group may be sent to the other device-in-communication if the response does not match the response condition but covers the response condition.

(8) Suppose a command sent as a request has a form that includes a command name, a plurality of arguments, and a range of each argument, and a response to each command has a plurality of types, with a value range and a restriction condition being defined for each type. The generation of a response condition and the search for an alternative command or an alternative command group may be performed by using these.

Also, suppose a command sent as a request has a form that includes a command name, a current communication status, a next communication status, a plurality of arguments, and a range of each argument, and a response to each command has a current communication status and a plurality of types, with a value range and a restriction condition being defined for each type. The generation of a response condition and the search for an alternative command or an alternative command group may be performed in consideration of the current communication status and the next communication status, by using these.

(9) A program that describes the same procedure as the processing shown in the above embodiments and modifications may be generated and recorded on a recording medium, such as a CD-ROM, which can read the program on a computer and the like.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A communication method for a communication device that sends a request to another communication device and receives a response to the request from the other communication device, the communication method comprising:
    a sending step of sending a command regarding a request to another communication device;
    a determination step of determining a condition to be matched to a correct response, the correct response being sent from the other communication device in reply to the command if the other communication device operates in conformity with a predetermined protocol;
    a check step of checking a response received from the other communication device in reply to the command, against the condition determined in the determination step; and
    a correction step of correcting the received response to match the condition, if the received response fails to match the condition in the check step.

2. The communication method of claim 1, further comprising:
    a level reception step of receiving a restriction level for restricting the correction of the response,
    wherein an execution level of the correction of the response is set in advance, and the correction step is executed if the execution level exceeds the restriction level.

3. A communication method for a communication device that sends a request to another communication device and receives a response to the request from the other communication device, the communication method comprising:
    a sending step of sending a command regarding a request to another communication device;
    a determination step of determining a condition to be matched to a correct response, the correct response being sent from the other communication device in reply to the command if the other communication device operates in conformity with a predetermined protocol;
    a check step of checking a response received from the other communication device in reply to the command, against the condition determined in the determination step;
    a replacement step of specifying one or more alternative commands that substitute for the command, if the received response fails to match the condition in the check step, and executing communication with the other communication device by using the one or more alternative commands sequentially; and
    a generation step of generating a response that matches the condition, based on a response received from the other communication device in reply to each of the one or more alternative commands.

4. The communication method of claim 3, further comprising:

a judgment step of judging whether or not the received response is correctable to match the condition, if the received response fails to match the condition in the check step, wherein the replacement step is executed if the received response is not correctable to match the condition in the judgment step, and the received response is corrected to match the condition if the received response is correctable to match the condition in the judgment step.

5. The communication method of claim 3, further comprising:

an alternative determination step of determining, for each of the one or more alternative commands, an alternative condition to be matched to a correct response which is sent from the other communication device in reply to the alternative command if the other communication device operates in conformity with the predetermined protocol; and an alternative check step of checking the response received from the other communication device in reply to each of the one or more alternative commands, against the alternative condition determined in the alternative determination step, wherein if the response received in reply to each of the one or more alternative commands matches the alternative condition or is correctable to match the alternative condition in the alternative check step, the one or more alternative commands are used instead of the command in subsequent communication.

6. The communication method of claim 3, further comprising:

an alternative determination step of determining, for each of the one or more alternative commands, an alternative condition to be matched to a correct response which is to be sent from the other communication device in reply to the alternative command if the other communication device operates in conformity with the predetermined protocol; and an alternative check step of checking the response received from the other communication device in reply to each of the one or more alternative commands, against the alternative condition determined in the alternative determination step, wherein if a response received from the other communication device in reply to any of the one or more alternative commands fails to match an alternative condition determined for the alternative command and is not correctable to match the alternative condition in the alternative check step, the replacement step is executed again.

7. The communication method of claim 3, further comprising:

a level reception step of receiving a restriction level for restricting the communication with the other communication device in the replacement step, wherein an execution level of the communication by using the one or more alternative commands is set in advance, and the communication with the other communication device by using the one or more alternative commands in the replacement step is executed if the execution level exceeds the restriction level.

8. A communication device that sends a request to another communication device and receives a response to the request from the other communication device, the communication device comprising:

a sending unit operable to send a command regarding a request to another communication device;

a determination unit operable to determine a condition to be matched to a correct response, the correct response being sent from the other communication device in reply to the command if the other communication device operates in conformity with a predetermined protocol;

a check unit operable to check a response received from the other communication device in reply to the command, against the condition determined by the determination unit; and a correction unit operable to correct the received response to match the condition, if the received response fails to match the condition as a result of the check by the check unit.

9. A communication device that sends a request to another communication device and receives a response to the request from the other communication device, the communication device comprising:

a sending unit operable to send a command regarding a request to another communication device;

a determination unit operable to determine a condition to be matched to a correct response, the correct response being sent from the other communication device in reply to the command if the other communication device operates in conformity with a predetermined protocol;

a check unit operable to check a response received from the other communication device in reply to the command, against the condition determined by the determination unit;

a replacement unit operable to, if the received response fails to match the condition as a result of the check by the check unit, specify one or more alternative commands that substitute for the command, and execute communication with the other communication device by using the one or more alternative commands sequentially; and a generation unit operable to generate a response that matches the condition, based on a response received from the other communication device in reply to each of the one or more alternative commands.

* * * * *